US009183132B2

(12) United States Patent
Nishihara

(10) Patent No.: US 9,183,132 B2
(45) Date of Patent: Nov. 10, 2015

(54) STORAGE DEVICE, COMPUTER SYSTEM, AND STORAGE SYSTEM

(75) Inventor: Toshiyuki Nishihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 201 days.

(21) Appl. No.: 11/493,904

(22) Filed: Jul. 27, 2006

(65) Prior Publication Data

US 2007/0028035 A1 Feb. 1, 2007

(30) Foreign Application Priority Data

Jul. 29, 2005 (JP) .................................. 2005-221714
May 17, 2006 (JP) .................................. 2006-137844

(51) Int. Cl.
*G06F 12/02* (2006.01)

(52) U.S. Cl.
CPC .... *G06F 12/0246* (2013.01); *G06F 2212/7205* (2013.01)

(58) Field of Classification Search
CPC ..................... G06F 12/0246; G06F 2212/7205
USPC .................................................. 711/103, 154
See application file for complete search history.

(56) References Cited

U.S. PATENT DOCUMENTS

| | | | | |
|---|---|---|---|---|
| 5,430,859 | A | * | 7/1995 | Norman et al. ................ 711/103 |
| 5,740,396 | A | * | 4/1998 | Mason ........................... 711/103 |
| 5,805,501 | A | * | 9/1998 | Shiau et al. ............... 365/185.29 |
| 5,933,847 | A | * | 8/1999 | Ogawa .......................... 711/103 |
| 6,484,270 | B1 | * | 11/2002 | Odani ................................ 714/6 |
| 6,552,956 | B2 | * | 4/2003 | Shibata ....................... 365/233.1 |
| 6,633,950 | B1 | * | 10/2003 | Brown et al. .................. 711/103 |
| 6,704,835 | B1 | * | 3/2004 | Garner .......................... 711/103 |
| 7,164,610 | B2 | * | 1/2007 | Kimura et al. ................ 365/195 |
| 7,706,186 | B2 | * | 4/2010 | Shinozaki ................ 365/185.17 |
| 2006/0221704 | A1 | * | 10/2006 | Li et al. .................... 365/185.28 |

FOREIGN PATENT DOCUMENTS

| | | |
|---|---|---|
| JP | 07-105691 A | 4/1995 |
| JP | 07-114500 A | 5/1995 |
| JP | 08-171622 A | 7/1996 |
| JP | 2002-260390 | 9/2002 |
| JP | 2004-110126 A | 4/2004 |

OTHER PUBLICATIONS

Japanese Office Action issued Dec. 20, 2011 for related Japanese Application No. 2006-137844.
Japanese Office Action issued Jul. 31, 2012 for corresponding Japanese Application No. 2006-137844.

* cited by examiner

*Primary Examiner* — Kalpit Parikh
(74) *Attorney, Agent, or Firm* — Michael Best & Friedrich LLP

(57) ABSTRACT

A storage device enabling realization of a new storage configuration enabling apparent elimination of the overhead and enabling high speed access all the time particularly when constructing a high parallel configured high speed flash memory system, that is, a storage device having a flash memory as a main storage and having the function of rewriting at least a partial region of the flash memory by additional writing update data in an empty region and invalidating original data and, at the time of standby of the device where there is no access from the outside, performing processing for automatically restoring the invalidated region to an empty region, and a computer system and a storage system using the same.

33 Claims, 24 Drawing Sheets

DIVIDED PROCESSING UNITS OF
RESTORATION OF INVALID PAGE REGION

DIVIDED PROCESSING UNITS OF
RESTORATION OF INVALID PAGE REGION

RESTORATION PROCESSING
OF INVALID PAGE REGION

STORAGE DEVICE, COMPUTER SYSTEM, AND STORAGE SYSTEM

CROSS REFERENCE TO RELATED APPLICATION

The present invention contains subject matter related to Japanese Patent Application No. 2005-221714 filed in the Japan Patent Office on Jul. 29, 2005, and Japanese Patent Application No. 2006-137844 filed in the Japan Patent Office on May 17, 2006 the entire contents of which being incorporated herein by reference.

BACKGROUND OF THE INVENTION

1. Field of Invention

The present invention relates to a storage device including a nonvolatile memory and a computer system and a storage system provided with same, more particularly relates to an increase of speed of data transfer in a storage device including a flash memory.

2. Description of the Related Art

In recent years, flash memories are coming into attention as storage media of digital still cameras and portable computer devices.

A flash memory is a semiconductor memory using tunneling or hot electron acceleration to cause electrons to pass through a gate insulation film and inject them into a floating gate or trap layer to change a threshold value of a cell transistor and thereby to store data. A single transistor using a multilayer gate structure, an MNOS structure, etc. is sufficient for configuring a memory cell, therefore an inexpensive and large capacity memory can be realized. As a typical example of this, a NAND type flash memory can be explained.

FIG. 1 is a diagram showing an example of the internal configuration of a NAND type flash memory. In the NAND type flash memory of FIG. 1, a plurality of memory units 1-1 to 1-$n$ connected to bit lines BL1 to BLn are arranged in an array state (vertically and horizontally). For example, a gate of a selection transistor 2 is connected to a selection gate line SL1, and a gate of a selection transistor 3 is connected to a selection gate line SL2. Further, gates of memory cells N0 to N15 are connected to word lines WL0 to WL15.

The memory cells N0 to N15 have multilayer gate structures and store data according to amounts of charges stored in the floating gates. Namely, when many electrons are stored in a floating gate, the threshold value of the transistor rises, therefore current penetration from any of the charged bit lines BL1 to BLn to the memory units 1 (-1 to -$n$) is detected at an access circuit 4 including a sense amplifier etc. to enable data judgment.

Such NAND type flash memory does not require provision of a contact region to the bit line for each memory cell, therefore is particularly suitable as a medium of a large capacity, inexpensive storage device.

In general, a flash memory has a very slow programming speed. Several hundred microseconds are taken per cell. Further, data cannot be overwritten, therefore it is necessary to erase data preceding programming. A long time up to a few milli (m) seconds is taken for this. This problem is handled by parallel processing of many memory cells.

Namely, for example, by simultaneously writing data in a block into a group of memory cells 5 connected to the same word line WL0 forming a page unit and erasing in a block all cell blocks 6 configured by a group of pages sharing memory units, the transfer speed of a program is improved.

Specifically, for example ISSCC 2002 Preprints, p. 106, session 6.4, discloses a 1 Gb NAND type flash memory. The page size here is 2 k bytes, and the erasure block size is 128 kB. Namely, by parallel erasing a group of memory cell of 128 k bytes in one memory array and programming the memory cells in parallel for each 2 k bytes, a program transfer speed of 10 MB/s is realized.

Further, in recent years, flash memories have been made multi-valued and have been further miniaturized. Along with this, the amounts of the signals have fallen. To deal with this, writing techniques with less of an adverse influence upon the non-selected cells have been studied and put into use.

For example in NAND type flash memories, ones limiting the write order of pages in an erasure block are becoming the mainstream. Japanese Patent Publication (A) No. 2002-260390 etc. disclose a write routine using the technique called "Local Self-Boost". An example of such a write operation in the NAND type flash memory of FIG. 1 will be explained below.

For example, when writing data into the memory cell N1 and injecting electrons into the floating gate thereof, first, the front and rear word lines WL0 and WL2 sandwiching the memory cell N1 therebetween are set to 0V, the selection transistor 2 is turned on, and the selection transistor 3 is turned off. Here, the bit line BL1 is set to 0V, the adjacent bit line BL2 for which no write operation is desired is set to 3V, the selected word line WL1 is boosted up to 20V, and all word lines WL3 to WL15 other than that are boosted up to 10V. When using such a write routine, any node sandwiched between the word lines WL0 and WL2 of 0V and linked with a non-selected bit line is disconnected from the other nodes, receives a coupling from the word line WL1, and rises in potential up to about 10V.

On the other hand, for the selected memory cell N1, 0V applied to the bit line BL1 is transferred to a channel of the cell transistor N1 for writing just while the adjacent cell transistor N0 is in a depression state. Namely, when using the above write technique, the adjacent cell on the bit line side of a cell to be written in is erased and becomes a depression state. For this reason, it is an indispensable to erasing the entire block, then write data in the order of the memory cells N15, N14, N13, . . . , and N0.

In this way, recent large capacity flash memories tend not to allow random write operations even in page write operations and to require sequential writing from the higher address to the lower address in a block.

SUMMARY OF THE INVENTION

In recent years, flash memories have been looked at as promising alternatives to hard disk drives in terms of power consumption, seek time, impact resistance, portability, etc. However, as explained above, it is difficut to increas in speed of flash memories unless making the access units larger. Further, data cannot be overwritten. Therefore, rewriting requires first erasure. The erasure block at that time is also large. The unit of erasure is tens of times larger than the access unit. This results in a long erase time and disturbance of non-selected cells at the time of a write operation in flash memories of general specifications. However, this causes the write efficiency to remarkably drop.

For example, assume configuring a storage device for replacing a hard disk drive by using a 10 MB/s transfer speed flash memory writing pages in units of 2 kB and erasure blocks in units of 128 kB as described above. When trying to raise the transfer speed up to 160 MB/s as targeted in high speed storage of serial ATA connections, it is necessary to employ a multi-bank or multi-chip configuration and operate for example 16 memory arrays in parallel.

FIG. 2 is a conceptual view of the flash memory configuring such a storage device. In FIG. 2, in order to realize high speed transfer, 16 arrays AR0 to AR15 are simultaneously operated. In this case, at the time of writing data, for example the data are simultaneously written into pages P0 and P1, while at the time of erasing data, the blocks B0 to B15 are simultaneously erased. At this time, an actual page region 21 forming the block write unit reaches 32 kB, and an actual erasure block region 22 forming the block erase unit reaches 2 MB.

On the other hand, in a usual file system, a cluster size forming the minimum write unit is about 4 kB. Random access is performed in these units. Further, a usual file storage system is randomly accessed in units of sectors of for example 512 bytes according to the ATA or other interface specifications. In that case, requests for rewriting only the pages P0 and P1 frequently occur. However, when accessing such a device, it is necessary to erase the entire erasure block region 22. If there are any valid files in the non-selected regions in that, it is necessary to protect them from the erasure. A typical example for dealing with this is as follows.

1. First, the data of the entire actual erasure block region 22 is read out from the flash memory to a memory region 24 of a separately provided buffer memory 23.
2. Next, the data corresponding to the pages P0 and P1 is updated in the memory region 24.
3. Next, the block region 22 on the flash memory is erased.
4. Finally, the updated block data of the memory region 24 is written back into the above erased region 22.

Namely, to write 4 k bytes, in actuality, the erasure and the reading and writing of 2 MB of data become necessary. Specifically, 200 microseconds (μs) are needed for reading and writing 1 page's worth of data, and 2 milliseconds (ms) are required for erasing the block, therefore approximately 30 milliseconds (ms) are needed.

As opposed to this, there is also the technique of preparing a spare erased block 25 in advance, combining the original data of the region 22 and the data after updating pages P0 and P1, and writing the same into the erased block 25. In this case, a virtual address structure is used to update the correspondence between the logical addresses and physical addresses in units of erasure blocks. The physical blocks corresponding to the logical addresses to be accessed are changed from the original erasure block region 22 to the block region 25 to which the data is to be moved.

Below, an example of the routine when using a virtual address structure to rewrite for example only one page in the erasure block will be explained in detail using FIGS. 3A and 3B. FIG. 3A shows a storage region of a flash memory 30, while FIG. 3B shows an address table 40.

Note that the most frequently used technique of this type at present is the method of address conversion in units of erasure blocks.

By referring to the address table 40 and using a logical block address (=LBA) as an index, it is possible to acquire an address of the corresponding erasure block on the flash memory, that is, a physical block address (=PBA). For example, when a host controller or an application requests access to a block address of "0x55", that address is converted to "0x6B" according to the table, and the erasure block 31 of the flash memory 30 is accessed. The routine for updating data on the flash memory under such control is as follows.

1. A spare erased block 32 is previously prepared. Assume the physical address is "0xAA".
2. Assume that the logical block address "0x55" is designated, the corresponding physical block address "0x6B" is acquired, and a page 33 in the block 31 is accessed. At this time, the data are sequentially copied from the block 31 of the flash memory 30 to be rewritten via the separately provided page buffer 34 to the spare block 32.
3. At the time of copying the page 33 to be updated, the desired portion is updated and copied on the page buffer 34 and this is reflected on the page 35 copied to.
4. When finishing copying all of the valid page data, the addresses of the block 31 and the spare block 32 are switched with each other on the address table 40.
5. Finally, the original block 31 is erased.

According to such a routine, after this an erasure block corresponding to the physical block address "0xAA" for the logical block address "0x55", that is, the spare block 32, is accessed and the overall integrity is maintained.

In this case, however, in order to update one page, the work of backing up the entire data of the block 31 in the spare block 32 is necessary, therefore reading all data in the block 31 to the page buffer 34 and writing the same into the spare block 32 become necessary. Accordingly, in this case as well, the actual transfer performance becomes remarkably low.

Due to such a circumstance, current storage devices using flash memories can only give a transfer performance much lower than that of a hard disk drive—particularly at the time of writing.

Further, when the write order in the erasure block is restricted, the problem becomes further serious. In a general file system, the write order among sectors is not guaranteed. Accordingly, a write operation is sometimes performed from the middle of the erasure block. In that case, even if address regions higher than that in the block are empty, data no longer can be written there. As a result, when a write request is issued to these regions later, the same processing as a rewrite becomes necessary, therefore the system repeats the above data backup, erasing, and writing.

This not only lowers the transfer performance, but also increases the number of times of erasure of the flash memory and lowers the service life thereof.

On the other hand, as technique for storing data to deal with the above issues, the additional rewritting type storage system is proposed. Such a system rewrites data by writing once the update data in an empty region and invalidating the original data. More specifically, it uses an address conversion table linking logical addresses with physical addresses, rewrites data by changing the physical address of the data concerned, and writing once the same into an empty region of the storage medium.

For example, Japanese Patent Publication (A) No. 8-328762 describes details of a management method in an additional rewritting type storage system using an address conversion table.

FIGS. 4A and 4B are diagrams for explaining an example of the management method in the additional rewritting type storage system using an address conversion table. FIG. 4A shows a storage region of a flash memory 50, and FIG. 4B shows an address table 60.

By referring to the address table 60 and using the logical page address (=LPA) as an index, the address of the corresponding page on the flash memory, that is, the physical page address (=PPA), can be acquired. For example, for writing data to a logical page address "0x5502" designated from the host controller, the address table is used to convert the address in the unit of a page to acquire the physical page address "0x6B05" on the flash memory 50. Due to this, the corresponding page region 53 in the block 51 is accessed. On the other hand, when updating the same page, a suitable empty region into which the data can be directly written is searched for in the flash memory 50. For example, when a head page region 55 of the erased empty block 52 corresponding to the physical block address "0xAA" is selected as a suitable writing destination, only the data of the page region 53 is updated via a page buffer 54 and written into that page region 55. At this time, the logical page address "0x5502" is mapped on the physical address "0xAA00" of the page region 55. The old data on the page region 53 is left as it is for a while and treated as invalid.

When managing data in this way, so long as there is an empty region in the flash memory, it is enough to write one page's worth of data for updating each page data. Accordingly, it is possible to rewrite data at a high speed. Since data does not have to be erased during that time, the number of times of rewrites of the flash memory can be greatly reduced, so the service life thereof can be improved.

In such an additional rewriting type storage device, however, the invalidated original data regions become useless. Accordingly, it is necessary to erase such regions to restore them to enable writing again. However, in that case, particularly when the erasure block includes a plurality of page regions, frequently there will be page regions including valid data in the same erasure block as that of the invalidated page regions. In order to restore such a block, it is therefore necessary to back up only the valid pages to another block before erasure. On the other hand, when information of the "validity/invalidity" of each page is stored on a RAM by a flag, the increase of capacity of the flash device is accompanied by a remarkable increase in the capacity of the RAM needed for storing the flags.

It is therefore desirable in the present invention to provide a storage device, a computer system, and a storage system enabling realization of a new storage configuration enabling apparent elimination of the above overhead and enabling high speed access all the time particularly when constructing a high parallel configured high speed flash memory system.

It is also desirable in the present invention to provide a storage system able to discriminate and judge a valid page and an invalid page without much use of hardware resources such as a RAM and to smoothly back up only a valid page to another block particularly when erasing a block in the additional rewritting type storage system.

According to a first aspect of an embodiment of the present invention, there is provided a storage device having a flash memory as a main storage and a control unit, wherein the control unit rewrites at least a partial region in the flash memory by additional writing update data in an empty region and invalidating the original data and automatically restores an invalidated region to an empty region at the time of standby of the device with no access from the outside as restoration processing.

Preferably, the flash memory has a plurality of erasure blocks as block erasure units, each erasure block including a plurality of page regions as write units independent from each other, and the control unit includes, as the restoration processing, processing backing up the data of a valid page region remaining in an erasure block including an invalid page region to be restored to an erased empty region of another erasure block.

Preferably, when access occurs to data stored in the storage device from the outside and the restoration processing is underway, the control unit interrupts the restoration processing and performs processing to respond to the access.

Preferably, when interrupting the restoration processing, the control unit stores progress information of the restoration processing in a register or a memory in the device and, when the access ends, restarts the restoration processing with reference to the progress information.

Preferably, at least a portion of the progress information of the restoration processing is recorded in a nonvolatile RAM.

Preferably, the nonvolatile RAM is at least one of a ferroelectric memory (FeRAM), a ferro-magnetic memory (MRAM), an ovonic unified memory (OUM), and a magnetoresistance effect memory (RRAM).

Preferably, the storage device has a processing unit inside it, the processing unit executes the restoration processing at the time of standby, the processing unit is interrupted when there is an access from the outside, and the processing unit interrupts the restoration processing and starts the access processing according to the interruption event.

Preferably, the control unit divides the restoration processing of one or a plurality of invalid page regions existing in one erasure block into a plurality of steps and executes a portion thereof at the time of standby of the storage device where there is no access from the outside.

According to a second aspect of an embodiment of the present invention, there is provided a storage device having a flash memory as a main storage and a control unit, wherein the control unit rewrites at least a partial region in the flash memory by additional writing update data to an empty region and invalidating the original data and restores the invalidated region to an empty region in response to a predetermined command from the outside as restoration processing.

According to a third aspect of an embodiment of the present invention, there is provided a storage device having a flash memory as a main storage, a cache memory, and a control unit, wherein the control unit rewrites at least a partial region in the flash memory by additional writing update data to an empty region and invalidating the original data and performs at least a portion of the processing for restoring the invalidated data to an empty region in parallel during a term where access from the outside hits the cache memory and the cache is accessed as restoration processing.

Preferably, the flash memory has a plurality of erasure blocks as block erasure units, each erasure block including a plurality of page regions as write units independent from each other, and the restoration processing includes processing backing up the data of a valid page region remaining in an erasure block including an invalid page region to be restored to an erased empty region of another erasure block.

Preferably, the control unit, when access from the outside misses the cache memory and the restoration processing is underway, interrupts the restoration processing and performs processing to respond to the access.

According to a fourth aspect of an embodiment of the present invention, there is provided a computer system having a host computer and a nonvolatile data storage including a flash memory as a main storage and storing various data handled in the host computer, wherein the host computer rewrites at least a partial region in the flash memory by additional writing update data to an empty region and invalidating the original data and executes processing for restoring the invalidated region to an empty region at the time of standby where there is no data processing request for the data storage other than that.

Preferably, the flash memory has a plurality of erasure blocks as block erasure units, each erasure block including a plurality of page regions as write units independent from each other, and the restoration processing includes processing backing up the data of a valid page region remaining in an erasure block including an invalid page region to be restored to an erased empty region of another erasure block.

Preferably, the host computer temporarily interrupts the restoration processing when a request for data access to the data storage occurs and the restoration processing is underway and, when temporarily interrupting it, stores progress information of the restoration processing in a register or a memory inside the computer system and restarts and continues the processing with reference to the progress information when executing the restoration processing again.

According to a fifth aspect of an embodiment of the present invention, there is provided a storage system having a flash memory as a storage medium and a control circuit, wherein the flash memory has erasure blocks as block erasure units, each erasure block including a plurality of data regions, and the control circuit reads out at least a portion of the region for each data region before erasing the erasure block, judges whether or not valid data is recorded in the data region from the read out value, and, when valid data is recorded as a result of judgment, copies the data of the data region to another erasure block.

Preferably, the control circuit reads out a flag value described in a portion of the data region and judges the data is valid when the flag value is a predetermined value.

Preferably, the control circuit reads out a handle value described in a portion of the data region, compares correspondence between a physical address on the memory of the data and the handle value with a predetermined table, and judges the data as valid when they coincide.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Below, preferred embodiments of the present invention will be explained with reference to the drawings.

Figure 1:
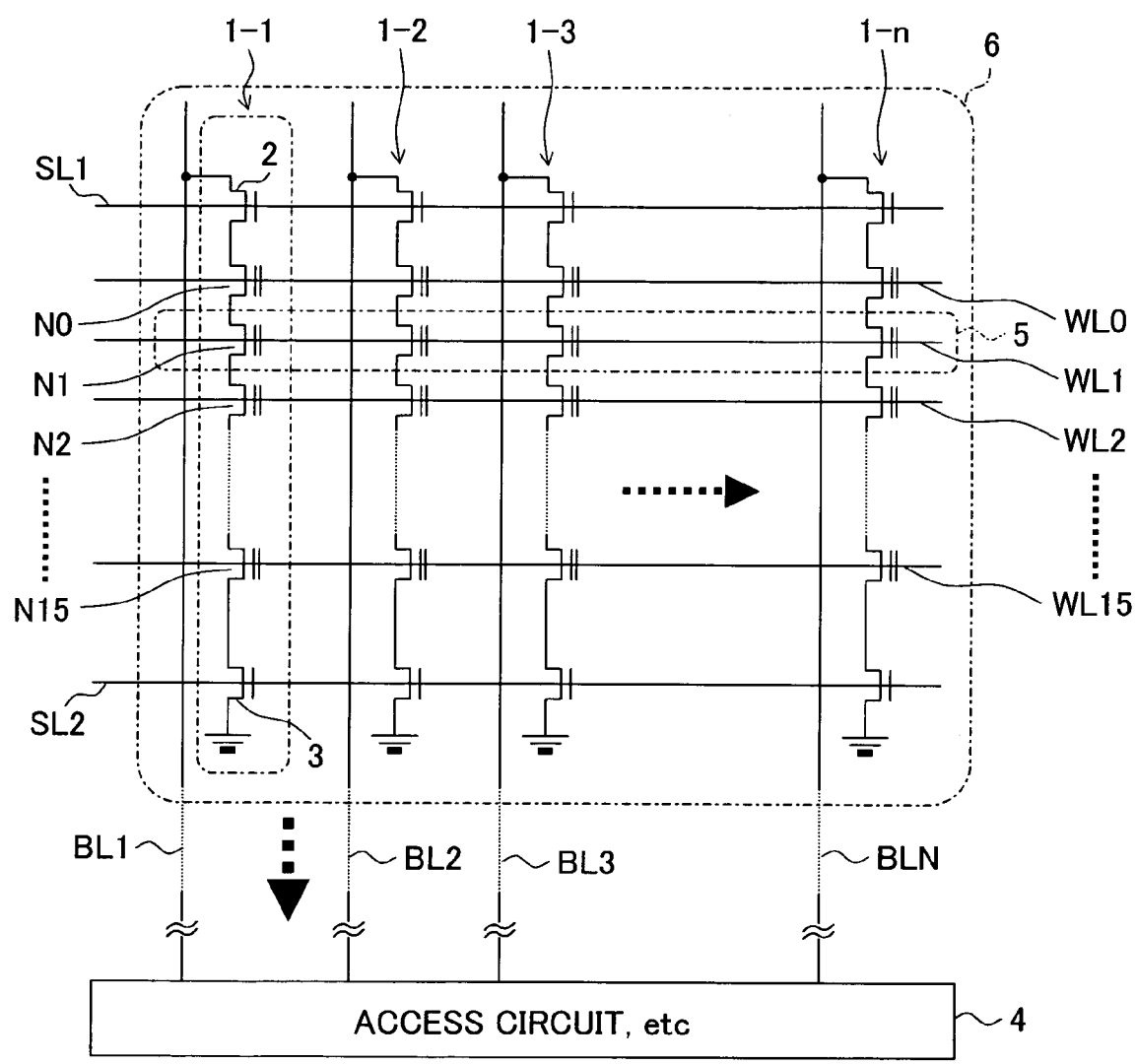
FIG. 1 is a diagram showing an example of the internal configuration of a NAND type flash memory.
Figure 2:
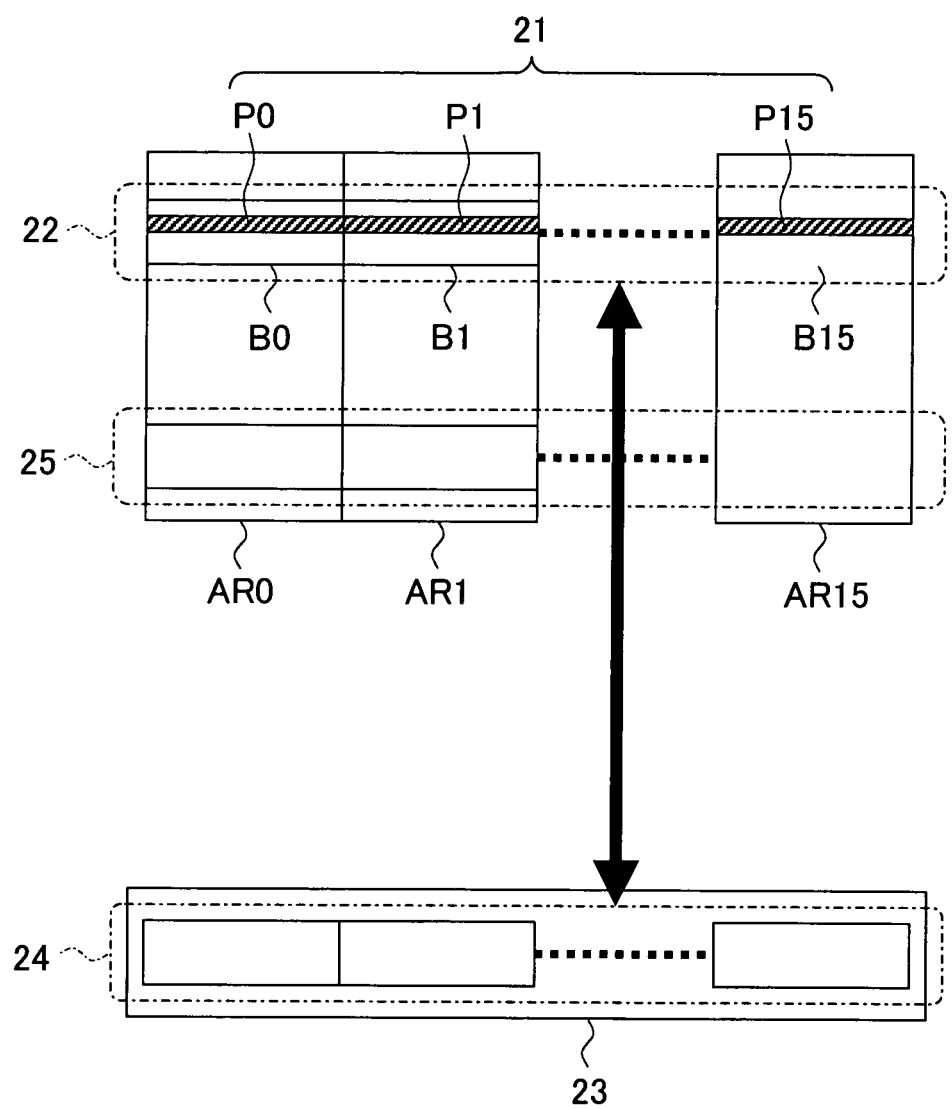
FIG. 2 is a diagram showing a conceptual view of a flash memory configuring a storage device.
Figure 3A:
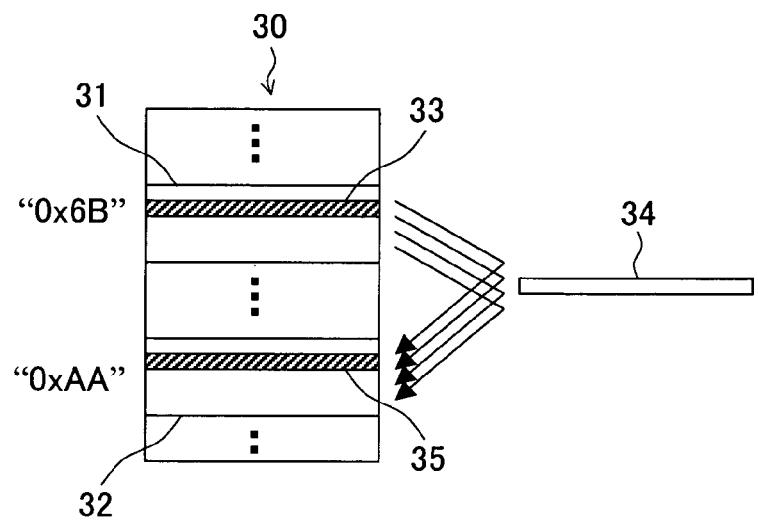
FIGS. 3A and 3B are diagrams for explaining an example of the routine when rewriting for example only one page in an erasure block.
Figure 3B:
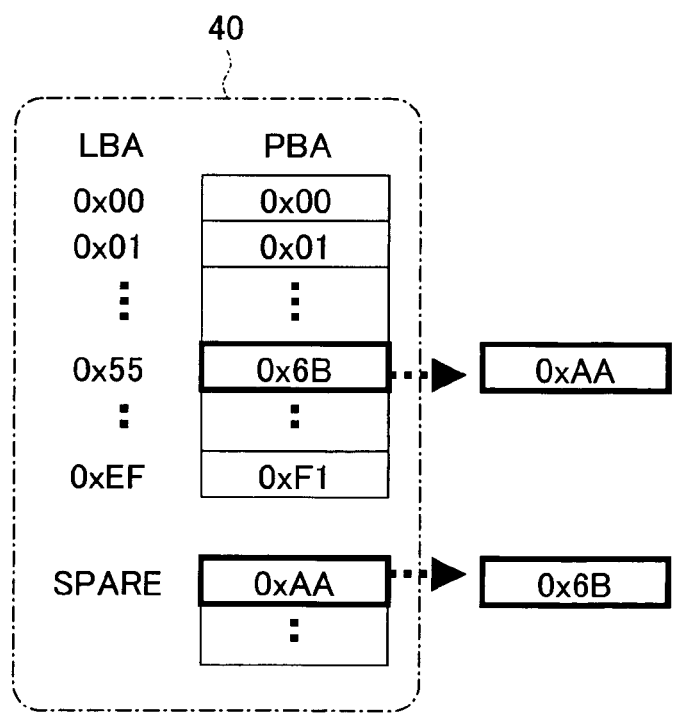
Figure 4A:
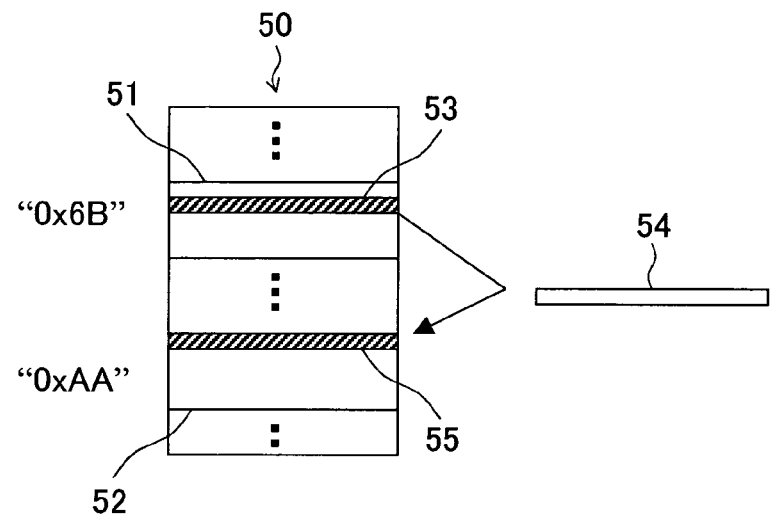
FIGS. 4A and 4B are diagrams for explaining an example of a management method in an additional rewritting type storage system using an address conversion table.
Figure 4B:
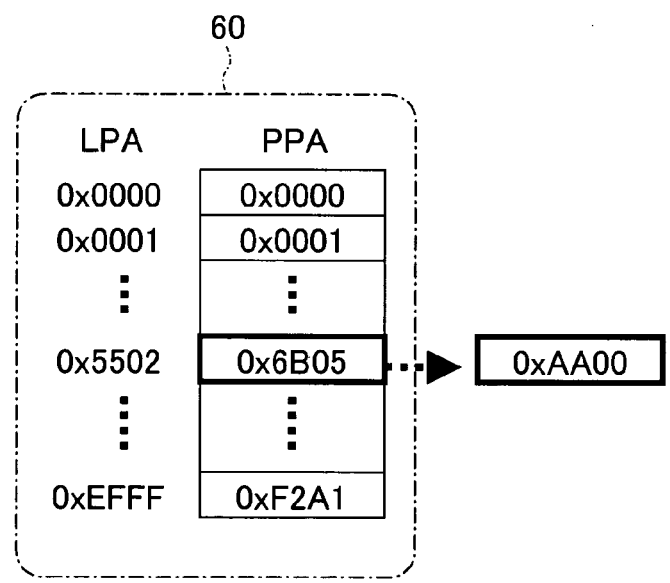
Figure 5:
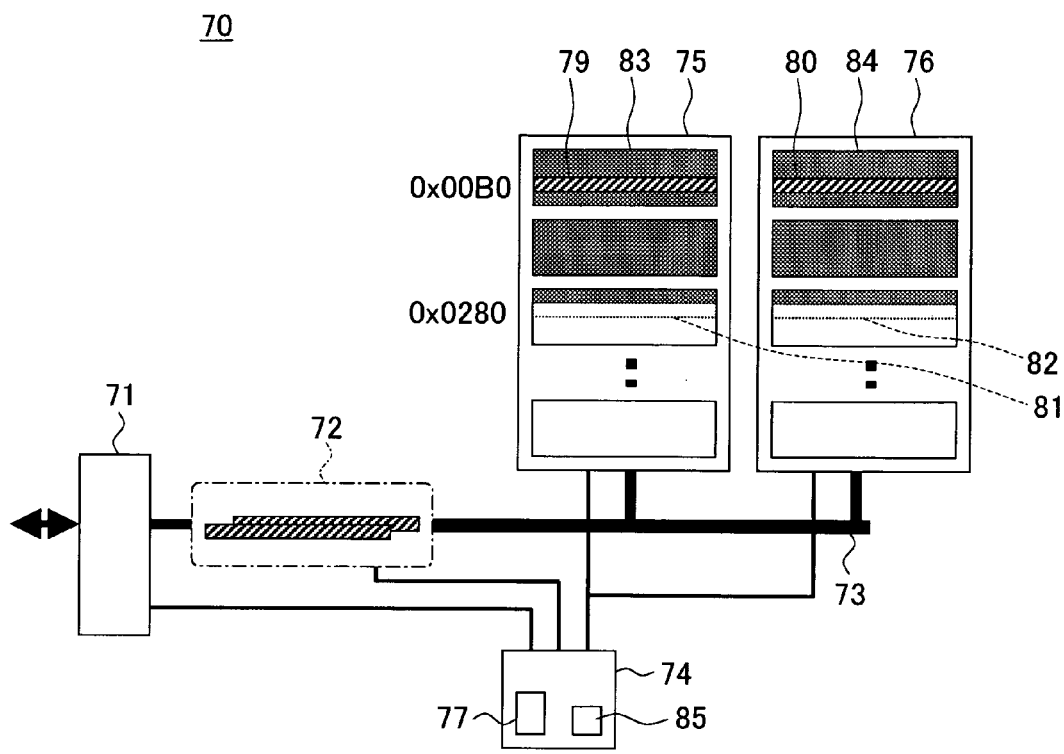
FIG. 5 is a view of the configuration showing a storage device according to a first embodiment of the present invention.
Figure 6A:
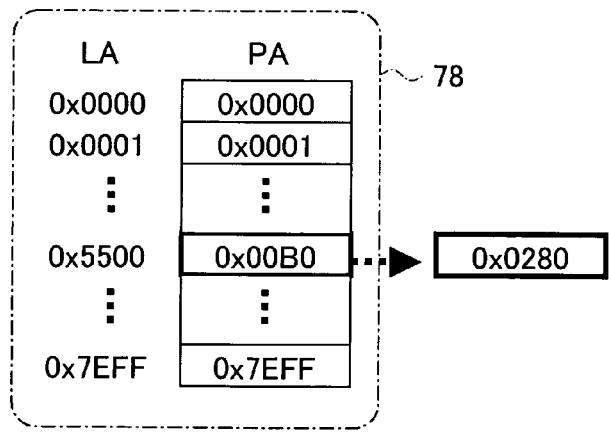
FIGS. 6A and 6B are diagrams showing an example of the construction of a address conversion table and a page state management table of the control circuit according to the first embodiment.
Figure 6B:
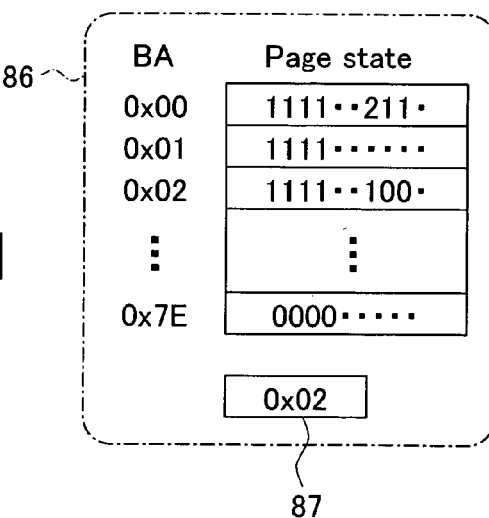

FIG. 5 is a view of the configuration showing a storage device according to a first embodiment of the present invention. FIGS. 6A and 6B are diagrams showing an example of the configuration of an address conversion table and a page state management table of a control circuit according to the first embodiment.

A storage device 70 of FIG. 5 has an interface circuit (I/F) 71, a page buffer 72, an internal data bus 73, a control circuit 74, and NAND type flash memories 75 and 76 as principal components.

In the storage device 70, the two chips of the NAND type flash memories 75 and 76 having 16-bit input/outputs are connected in parallel to a 32-bit internal data bus 73. The two chips of the flash memories 75 and 76 are simultaneously accessed in parallel in a read or write operation. The page buffer 72 is a buffer for temporarily storing the accessed page region and is connected with the outside through the interface circuit 71. The control circuit 74 is a controller for managing the transfer of the data between the memory chips constituted by the flash memories 75 and 76 and the page buffer 72 and the interface circuit 71 and is controlled by a processing unit constituted by a built-in CPU 85. In the similarly built-in RAM 77, a program region for controlling the CPU 85 and a work area are secured. At the same time, an address conversion table 78 and a page state management table 86 are constructed.

The storage device 70 is accessed as follows. Here, for simplification, assume that addresses of the hexadecimal notation are assigned as follows. For example, when the external input address is "0x5500C", the higher "0x5500" is the page address, and the lower "0xC" is the sector address in the page region. The storage device 70 can be randomly accessed in single sector units.

When the sector address of "0x5500C" is input from the outside at the time of a read operation, the control circuit 74 receives the higher page address to access the built-in RAM 77 and acquires the physical page address (PA) "0x00B0" corresponding to the logical page address (LA) "0x5500" from the address conversion table 78. In this physical page address PA, the hugher "0x00" is the addresses of the erasure blocks 83 and 84 in the memory chip flash memories 75 and 76. The lower "0xB0" is the addresses of the page regions 79 and 80 in the erasure blocks. Both of the memory chip flash memories 75 and 76 are accessed based on this physical address PA. The data of page regions 79 and 80 stored at the page addresses "0x00B0" are read out from these and stored in the page buffer 72. The interface circuit 71 selects the sector corresponding to the lower "0xC" from among those and outputs the same to the outside.

On the other hand, when writing data to "0x5500C" from the outside, first, the data of page regions 79 and 80 are read out from the memory chip flash memories 75 and 76 by the same routine as that at the time of a read operation and stored in the page buffer 72. Thereafter, the sector corresponding to the lower "0xC" is selected and updated to the data input from the outside.

The updated page data is written back into the flash memories 75 and 76. At that time, the page regions 79 and 80 of the read out side are not rewritten. Rather, the data are written into the empty regions 81 and 82. The physical page address of this page region is "0x0280", that is, corresponds to the page of "0x80" in the erasure block "0x02". Further, up to before this processing, that region was the unused empty page which was not registered in any physical address field of the address conversion table 78. The updated data is written into this region in the form of an additional rewritting operation. At the same time, in the physical address field corresponding to the logical address "0x5500 of the address conversion table 78, the physical page addresses "0x0280" of the empty regions 81 and 82 are registered.

In this way, in the management of the empty regions for writing once the update data, for example the page state management table 86 as shown in FIG. 6B is constructed and used in the RAM 77. The table records the states of pages stored in the erasure blocks expressed by BA (Block Address) by a 2 bit flag train. "0" indicates an empty region, "1" indicates a valid region for which a write operation was carried out, and "2" indicates an invalid region invalidated since the data was updated.

In the state of FIG. 6B, the physical page "0x80" at the block address "0x02" and on all become empty regions. For example, in order to determine an empty region for the additional rewriting operation, a pointer to the block "0x02" to be searched for at present is stored in the memory region 87. When there is a write request to a flash memory, the flags of this table are scanned from the high pages thereof to search for empty page regions. When all empty regions of the block are used, the pointer is incremented, and empty page regions are searched for from the block of "0x03". If the pointer is circulated from the head to the tail of the block addresses in this way, the entire area of the flash memory can be uniformly written in.

In this configuration, two memory chip flash memories 75 and 76 are arranged in parallel, and the page data read out from these are stored in the page buffer 72 all together. At this time, the memory capacity becomes two times that case where a single chip is used, but this is realized by the size of the page region, which is the block access unit and also the management unit of the address conversion table 78, becoming double, so the number of pages does not increase. Accordingly, the address conversion table 78 does not change, and also the capacity of the memory (RAM) 77 for storing that does not increase. On the other hand, the weak points of the parallel processing, that is, the increase of the number of times of erasure and the acceleration of the rewrite fatigue, are greatly eased by an additional rewritting type write operation using address conversion in units of pages.

Note that when rewriting a large sized file or otherwise rewriting an entire erasure block, backup processing of the valid data is inherently unnecessary. Only block erasure is sufficient. Accordingly, in such a case, there is no large difference in performance difference due to the employment of the above additional rewritting type write operation. Accordingly, the general usual type rewrite operation and the additional rewritting type rewrite operation may be combined in accordance with the case.

When performing an additional rewritting type write operation explained above, the page regions 79 and 80 corresponding to the physical page address "0x00B0" at which the data before updating were stored are deleted from the physical address field of the address conversion table 78 and no longer can be accessed from the outside. Namely, they are invalidated. However, data are written in them, so they may be impossible to use as empty regions as they are. When the rewriting as explained above is repeated many times, many invalid page regions are generated. It is necessary to erase and restore these so that they can be used as empty regions again. Further, in that case, it is necessary to back up (save) the valid data remaining in the erasure blocks 83 and 84.

In such restoration processing, for example, first, the valid data in the target block is once read out to the page buffer in the same way as that at the time of updating and then is written into a spare page region by an additional rewritting operation to thereby substantially back it up. Namely, the original regions thereof are all invalidated by provisionally updating valid pages. Thereafter, the restoration processing is executed by erasing the target block.

Figure 7A:
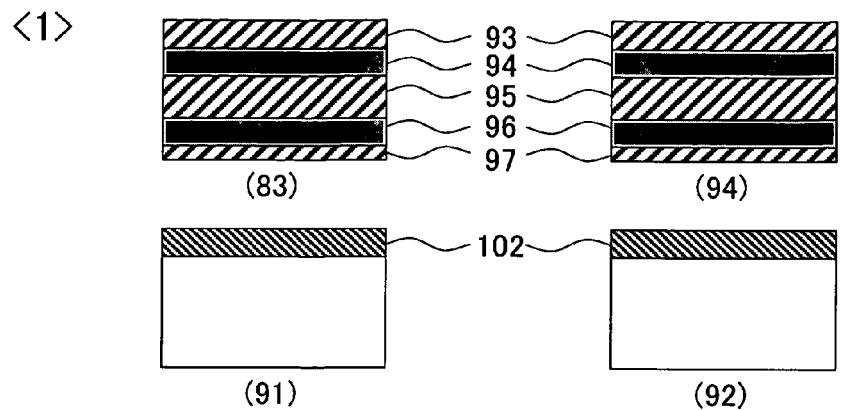
FIGS. 7A to 7C are diagrams for explaining a routine for restoration of an invalid region of the first embodiment.
Figure 7B:
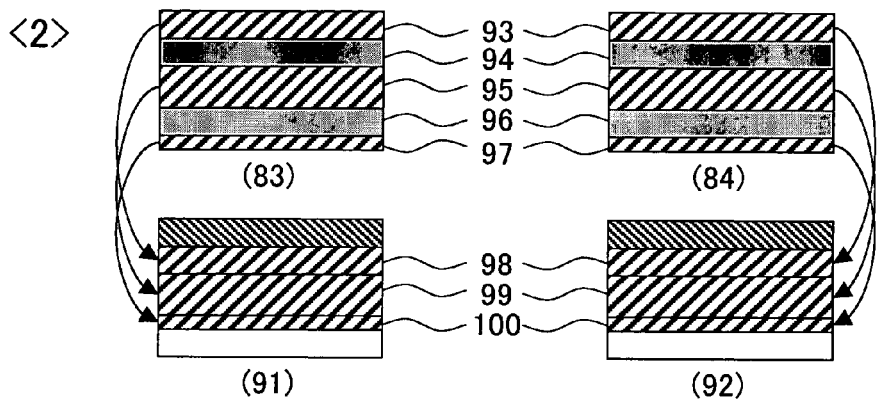
Figure 7C:
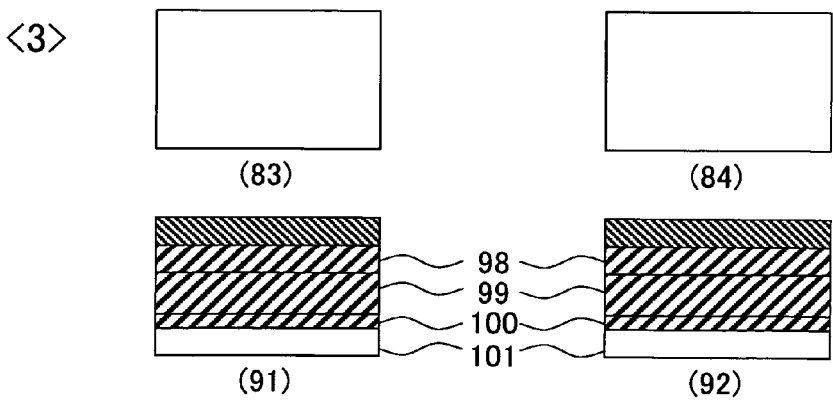

FIGS. 7A to 7C are diagrams for explaining the routine for restoration of invalid regions. FIGS. 7A to 7C illustrate the concrete routines <1>, <2>, and <3> for backing up the valid data inside the erasure blocks 83 and 84 and substantially restoring the invalid page regions.

Routine <1>

Assume that the rewriting by additional rewritting operation is further advanced from the state of FIGS. 6A and 6B, the data are once written into the erasure blocks 83 and 84, then the page region groups 94 and 96 invalidated by updating coexist with the valid page region groups 93, 95, and 97. Here, it is necessary to restore the invalidated regions to the empty regions while leaving alone the data of the valid page regions. On the other hand, the blocks 91 and 92 are erasure blocks used as the empty regions for the current additional rewritting operation. The writing is carried out up to a page region 102.

Routine <2>

The valid page region groups 93, 95, and 97 are sequentially copied to the empty regions 98, 99, and 100 in the erasure blocks 91 and 92 from the top. At this time, the data are read out from the erasure blocks 83 and 84 to for example the page buffer 72 of FIG. 5 one page region by one page region in order and written into the erasure blocks 91 and 92. At the same time, the address conversion table 78 is updated. Namely, the physical page addresses of the copy destination are registered in the physical address fields corresponding to the logical addresses of the page regions. This operation is equal to the work (processing) of rewriting the valid page region groups 93, 95, and 97 by the additional rewritting method. In actuality, the data is not rewritten, but only copied, but according to this work, all pages in the erasure blocks 83 and 84 are invalidated, and the data of the valid page regions are substantially backed up to the erasure blocks 91 and 92.

Routine <3>

The erasure blocks 83 and 84 are erased. Due to this, all of the internal portions thereof become empty regions, and usage for later additional rewritting operation becomes possible. With this, the invalid regions 94 and 96 are effectively restored.

In this way, the restoration processing of the invalid page regions is comprised of the backup by the copying of each valid page region and the erasure of the original erasure block. Further, if dummy updating the valid pages in an erasure block to be restored by the same routines as those of the usual update processing and thereby backing up the page, it is possible to combine the backup of valid pages at the time of restoration processing with the usual write algorithm. In this case, not only does the control become easy, but also various types of measures for improving the reliability at the time of writing such as making the write operations into the flash memories uniform can also be applied to the restoration processing and the overall reliability of the storage device can be improved.

Here, the first embodiment of the present invention provides the semiconductor memory device employing an additional rewritting type write operation into a flash memory described above with a mechanism for automatically executing the restoration processing of the regions invalidated at the standby time.

The "standby time" referred here is for example a state after the power of the storage device is turned on, the initialization work ends, and access is possible at any time, but there is no access request from the outside. In actuality, a file storage system such as a hard disk drive is not accessed from the outside all the time. The standby state is rather longer. Alternatively, even in the case where the storage device is seemingly continuously accessed such as when recording a video image, if the average rate of transfer of the data input from the host computer to the storage device is sufficiently smaller than the data transfer capability of the storage device itself, in actuality, the host side buffer stores a certain amount of video image data, the inputs the data to the device all together. Accordingly, while the buffer is storing the video image data, the device enters the standby state.

Figure 8:
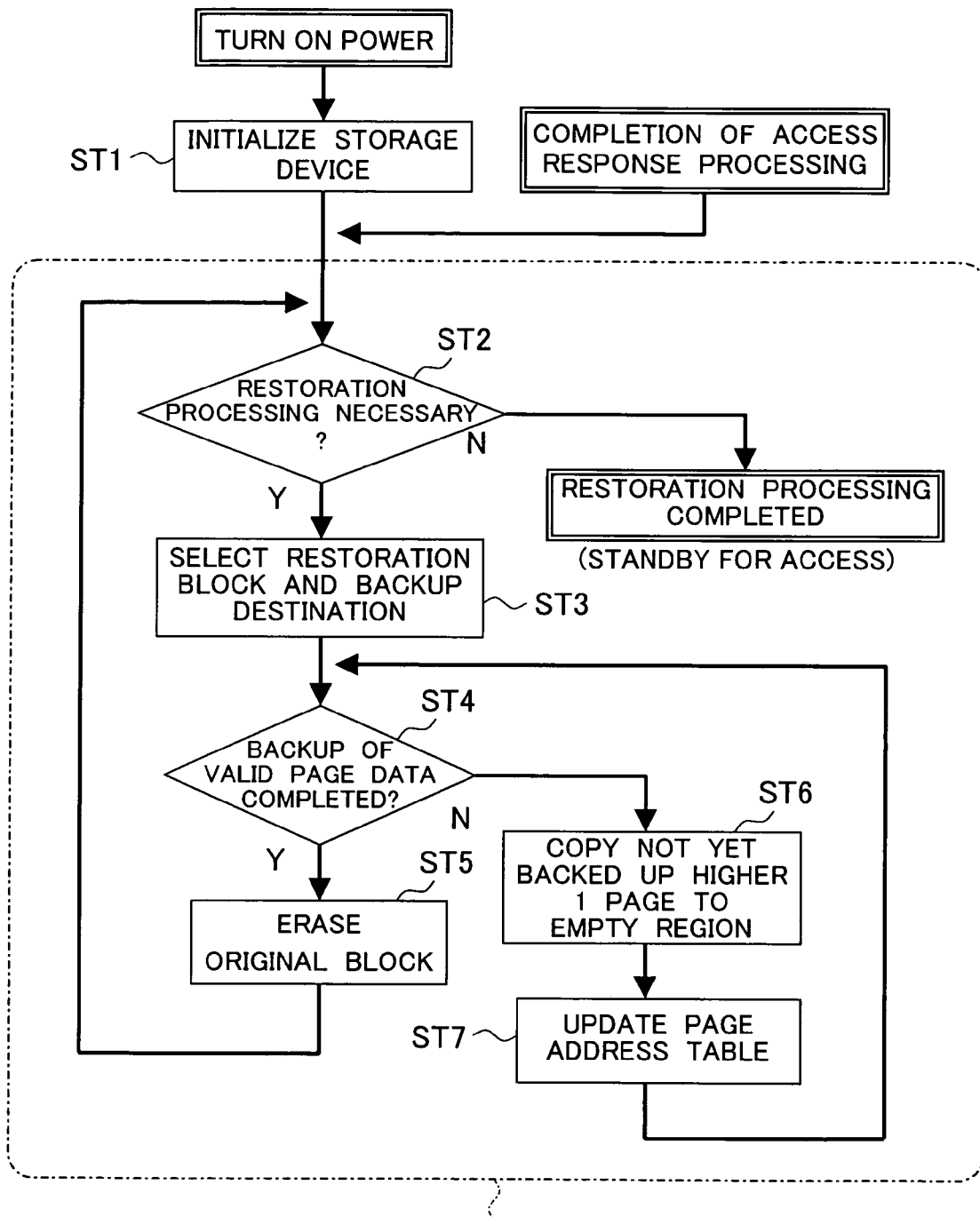
FIG. 8 is a flow chart showing an example of a control routine for restoration processing by the device of the first embodiment.

FIG. 8 is a flow chart showing an example of the control routine of execution of the restoration processing by such a device.

After the power of the storage device is turned on and the initialization necessary for access is carried out (ST1), the restoration processing of invalid page regions is executed. This is comprised of a repetition of the processing of following steps ST2 to ST5.

<Step ST2>

Invalidated page regions are searched for. It is judged by a suitable algorithm whether or not the restoration processing thereof is to be executed. For example, restoration in the following case is effective:

There is a certain number or more of invalid page regions in the same block. (Such a block substantially has a large number of pages to be restored, while the number of pages which must be backed up is small. Accordingly, efficient restoration is possible.)

There is a certain ratio or more of invalid page regions with respect to the empty regions.

The empty regions constitute less than a certain ratio of the overall capacity.

When restoration processing is unnecessary, the processing is terminated, and the device enters into the usual standby state where only an access is awaited and no other operation is executed.

<Step ST3>

When it is judged that the restoration processing is necessary, the erasure block to be restored and the empty region for backup in another erasure block are selected, and the restoration processing is started.

<Step ST4>

It is judged whether or not there are any valid page regions to be backed up in the erasure block to be restored. When there are, the data is copied to the empty region one page region by one page region from the top. Whenever a page finishes being copied, the address conversion table is updated.

<Step ST5>

When the backup of all valid page regions is completed, the original block is erased.

Note that, in such a storage device, a mechanism for interrupting the above restoration processing when access is requested from the outside is necessary. Further, one erasure block requires a few milliseconds for just erasure to restore the invalidated page regions in it. Several tens of milliseconds are sometimes needed for completing all of the processing of steps ST2 to ST5. Accordingly, a mechanism for dividing and processing the same is necessary.

One of the effective measures in order to cope with such a request is to process steps ST2 to ST5 under the control of the CPU (for example, the built-in CPU 85 in FIG. 5) in the storage device, interrupt the CPU when an access command is input from the outside, and transfer the control to the program for processing for response to the access.

Namely, when executing processing for responding to access by interruption of the CPU controlling the internal portion of the storage device, the restoration processing can be interrupted at any step among the steps ST2 to ST5 described above. In this case, if a write operation of the page data into the flash memory has been started, the processing is interrupted after finishing writing one page and updating the address table. Due to this, the access processing can be safely started with a delay of about several hundred micro ($\mu$) seconds. Further, if erasure of the flash memory has been started, the processing is interrupted when finishing the erasure. Due to this, the access processing can be safely started with a delay of a few milliseconds.

Further, when the flash memory chip itself is designed to be able to handle the interruption processing, it is possible to immediately reset the flash memory even in the middle of the write or erase operation and start the data access requested in a time on the order of several tens of microseconds. In this case, the write or erase operation is interrupted in the middle, but if the location of the page region written into or the erasure block in the middle of erasure is known, the processing can be completed without problem by restarting the above write or erase processing again after the completion of the processing for response to the access.

Note that, in either case, when the restoration processing is interrupted, desirably the state of progress is stored in a memory or register in the storage device. When the processing for response to the access is completed, the restoration processing is restarted based on that information. For example, when the processing is interrupted in the middle of the processing of steps ST2 to ST5, at least the location of the erasure block to be restored is stored as the progress information. Further, desirably, a flag indicating that the restoration processing was interrupted is set. Other than this, according to need, the location of the empty region for backup of the valid page, the page being backed up, or the like may be stored. These information are stored in for example a suitable region in the RAM 77 in FIG. 5. For example, these may be stored as variables in firmware controlling the CPU.

When the processing for response to the access is completed, the device returns to the standby state again and, for example the restoration processing is restarted from step ST2. At that time, it is judged at step ST2 that there was interrupted processing based on the flag, so the routine proceeds to the restoration processing. The erasure block to be restored and the empty region for backup are selected so as to continue the previous processing in the processing of step ST3. Further, at step ST4, it is checked and judged up to where the backup of the valid page data was completed at the time of the interruption or if the backup was already completed and the operation was interrupted during the erasure of the original block, then the restoration processing is executed from the uncompleted step according to that information.

By employing such a configuration, the restoration processing is automatically executed inside the storage device with no awareness from the host computer. When access is received, the restoration processing is automatically interrupted, and processing for response to the access is executed at a high speed.

It is possible to use the same interface specifications and commands from the host computer as those of a usual hard disk drive. For example, an ATA, PCI-express, USB, or other general purpose interface can be used, and the device can be operated by only the standard commands prepared for each standard. Therefore, there is no necessity for preparing a dedicated driver. In the same way, replacement of a general flash memory card etc. is easy.

In the above example, the restoration processing of invalid page regions of steps ST2 to ST5 occurring in an additional rewritting type rewrite operation were executed divided by interruption of the CPU along with an access request from the host computer. Namely, the restoration processing originally taking several tens of milliseconds was executed divided in the interval between accesses. Note that as the method of division of the restoration processing, various variations can be considered. For example, if previously dividing the restoration processing of steps ST2 to ST5 in FIG. 8 described above into smaller tasks and executing the processing in these as units, the device can quickly cope with access even if there is no interruption. An example thereof is shown in FIG. 9.

Figure 9:
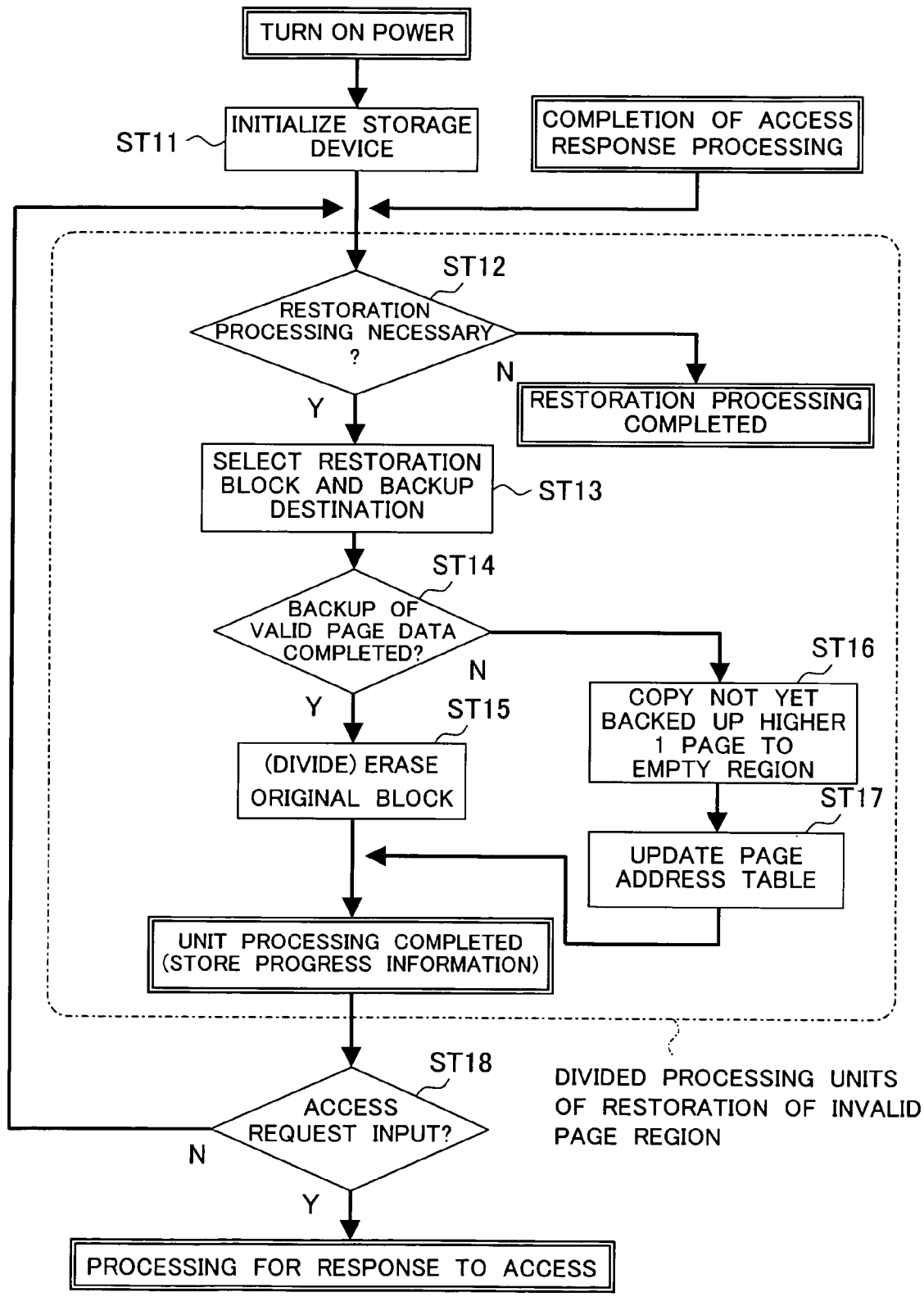
FIG. 9 is a flow chart for explaining divided processing units of restoration of an invalid page region of a modification of the first embodiment.

FIG. 9 is a flow chart for explaining divided processing units of the invalid page region restoration of a modification of the first embodiment.

The storage device executes the processing for restoration of invalid page regions for each divided unit after the power is turned on and the initialization necessary for access is performed (ST11). The divided processing units are comprised of the following steps ST12 to ST15 of processing.

<Step ST12>

Invalidated page regions are searched for. It is judged by a suitable algorithm whether or not the restoration processing thereof is to be executed. Here, when there is uncompleted restoration processing which has not been completed at the erasure block level, the routine proceeds to the following processing. When the restoration processing is unnecessary, the processing is terminated, and the device enters into the usual standby state where only access is awaited and no operation is executed.

<Step ST13>

When it is judged that restoration processing is necessary, the erasure block to be restored and the empty region for the backup are selected and the restoration processing is started. When uncompleted restoration processing remains, the erasure block which had been worked on is selected.

<Step ST14>

It is judged whether or not there are any valid page regions to be backed up in the erasure block to be restored. If there are, the highest page is copied to the empty region from the top (ST16). Further, the address conversion table 78 is updated and this divided processing unit is ended (ST17).

<Step ST15>

When the backup of all valid page regions is completed, the original block is erased and this divided processing unit is ended. Note that if the flash memory chip has a function enabling erasure by division by interrupting an erase operation and erasing the same block again, it is also possible to perform erasure for a predetermined time, interrupt it even before the completion of the erasure, and then end this divided processing unit. Namely, the divided erasing may be carried out.

Note that when the above divided processing unit ends and the restoration work of the invalid page regions at the erasure block level is uncompleted, information on the progress of the restoration processing such as the erasure block in the middle of the restoration work or the cumulative time of erasure is desirably stored in a memory or register of the storage device.

Such divided processing units may be ended once with each processing, but when there is no request for access from the outside (host computer), it is also possible to continue and execute the next divided processing unit as shown in the figure.

Next, a second embodiment of the present invention will be explained. The second embodiment of the present invention is the aspect of executing the above restoration processing according to the dedicated restoration command from the outside.

Figure 10:
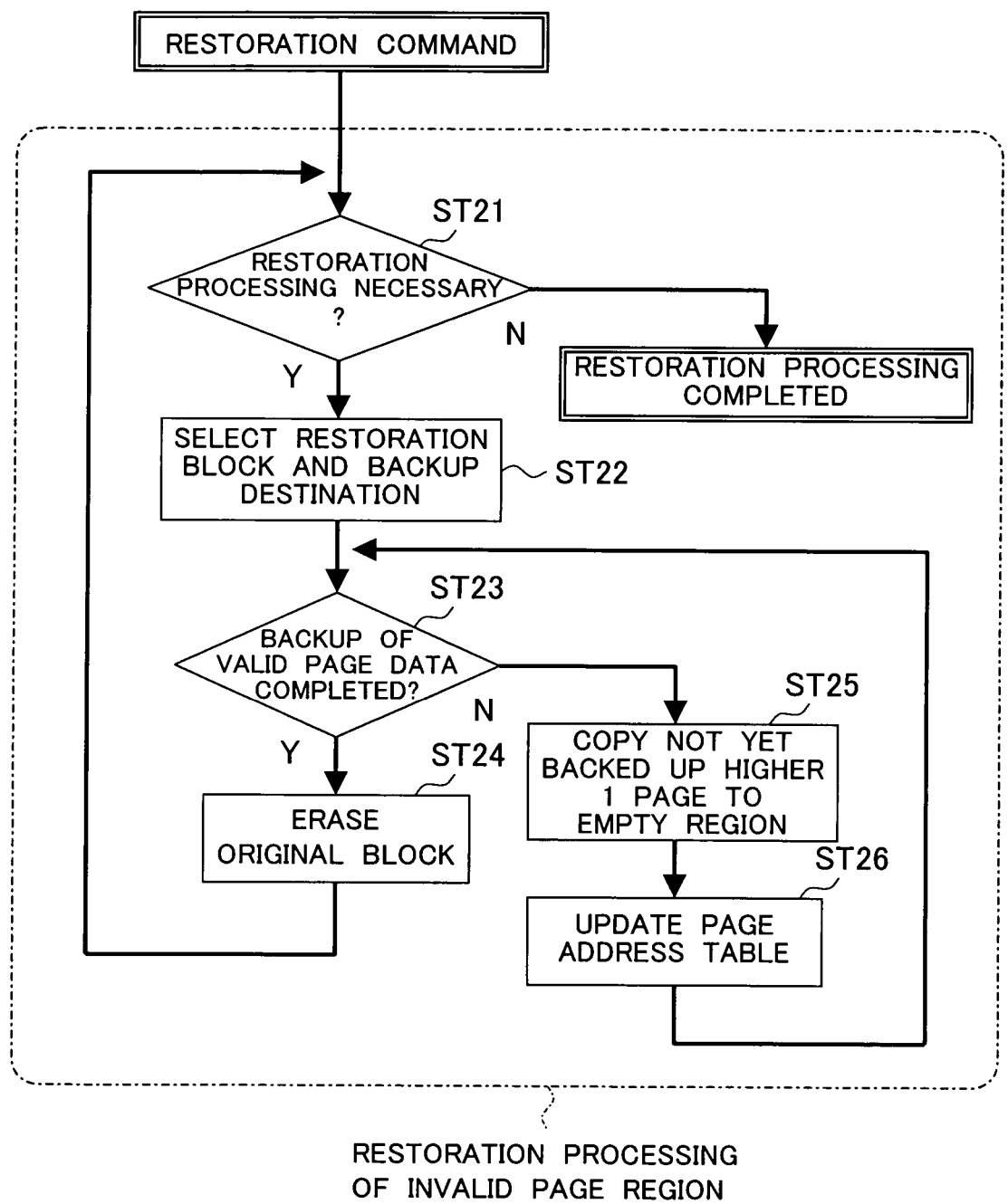
FIG. 10 is a flow chart for explaining restoration processing according to a second embodiment of the present invention.

FIG. 10 is a flow chart for explaining the restoration processing according to the second embodiment.

In the first embodiment, the restoration processing was automatically executed when the device entered into the standby state, but in the second embodiment, the restoration processing is executed according to a restoration command input from outside of the device. In the figure, the restoration processing ST21 to ST26 of the invalid page regions indicated by a broken line in the figure are the same as the processing (tasks) ST2 to ST7 of FIG. 8 in the first embodiment.

Further, the second embodiment has a function of interrupting the restoration processing in response to a predetermined command from the user. For example, when it is an access command to the data, the processing for response to the access is carried out, while when it is an command for only interrupting the restoration processing, the device is shifted to the access standby state. The access command, the start command of the restoration processing, and the interruption command of the restoration processing execute the respective processing routines using processing for interrupting the CPU as an event.

Further, preferably, when interrupting the restoration processing, in the same way as the first embodiment, the state of progress thereof is stored in the memory or register in the storage device and, when a restoration command is input again, the restoration processing is restarted based on that information.

For example when interrupted in the middle of the processing of steps ST21 to ST24, at least the location of the erasure block to be restored is stored as the progress information. Further, desirably a flag indicating that the restoration processing was interrupted is set. Other than this, the location etc. of the empty region for backup of the valid pages or the pages being backed up may be stored according to need. This information is stored in for example a suitable empty region in the RAM 77 in FIG. 5.

When the restoration command is input again, the restoration processing is restarted from step ST21. At that time, at step ST21, it is judged that there was interrupted processing based on the above flag, and the routine proceeds to the restoration processing. At step ST22, the erasure block to be restored and the empty region for backup are selected so as to continue with the previous processing. Further, at step ST23, it is checked and judged up to where the backup of the valid page data was completed at the time of the interruption or if the backup was already completed and the operation was interrupted in the middle of erasing the original block, then the restoration processing is executed from the uncompleted step according to that information.

In the second embodiment, it is necessary for the host computer side to judge the start timing of the restoration processing. Commands or tasks unique for the management of the storage device are needed, but there is the advantage that the restoration processing can be executed at the most suitable timing in accordance with the situation of the user input and the application program. Further, if previously predicting the access to the device, interrupting the restoration processing, and shifting to the standby state, the time needed for the interruption processing becomes unnecessary, and quicker processing for response to access becomes possible. For example, when there is no key input or mouse input from the user for a certain time, the restoration processing is started, and the restoration processing is interrupted at the time when input is made.

In the second embodiment, steps ST21 to ST24 of the restoration processing for invalid page regions occurring in an additional rewritting type rewrite operation are divided by interruption along with an interruption command etc. However, in the same way as the modification of the first embodiment, if previously dividing the restoration processing into smaller tasks and executing them as units, access can be quickly handled even if there is no interruption.

Figure 11:
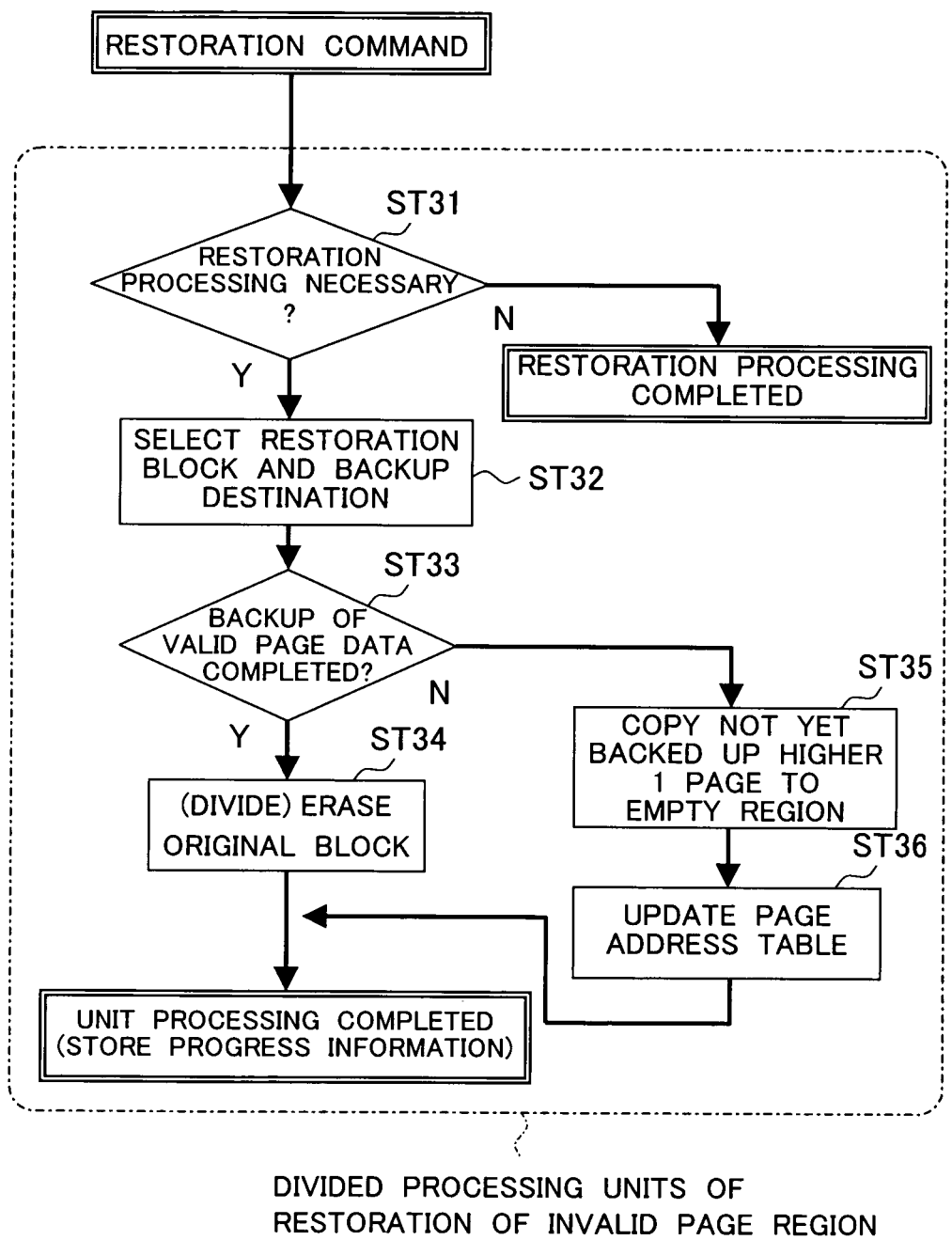
FIG. 11 is a flow chart for explaining divided processing units of restoration of an invalid page region of a modification of the second embodiment.

FIG. 11 is a flow chart for explaining the divided processing units of the invalid page region restoration according to a modification of the second embodiment. In the figure, the divided processing units ST31 to ST36 of the invalid page region restoration indicated by the broken line are the same as the processing (tasks) ST12 to ST17 of FIG. 9 in the modification of the first embodiment.

Note that when the above divided processing units end or the restoration work of the invalid page regions at the erasure block level is not yet completed, the progress information of the restoration processing such as the erasure block being worked on or the cumulative time of the erasing according to need is desirably stored in the memory or register in the storage device.

Further, such divided processing units come in a variety of types. For example, the divided processing units may be repeated a plurality of times in response to a command from the host computer or the content of the divided tasks may be changed. Further, a "non-division mode" of performing one erasure block's worth of the restoration processing all together by one command may be added.

Next, a third embodiment of the present invention will be explained. The third embodiment of the present invention provides a cache memory inside the storage device and perform the restoration processing during the period where the cache memory is hit.

Figure 12:
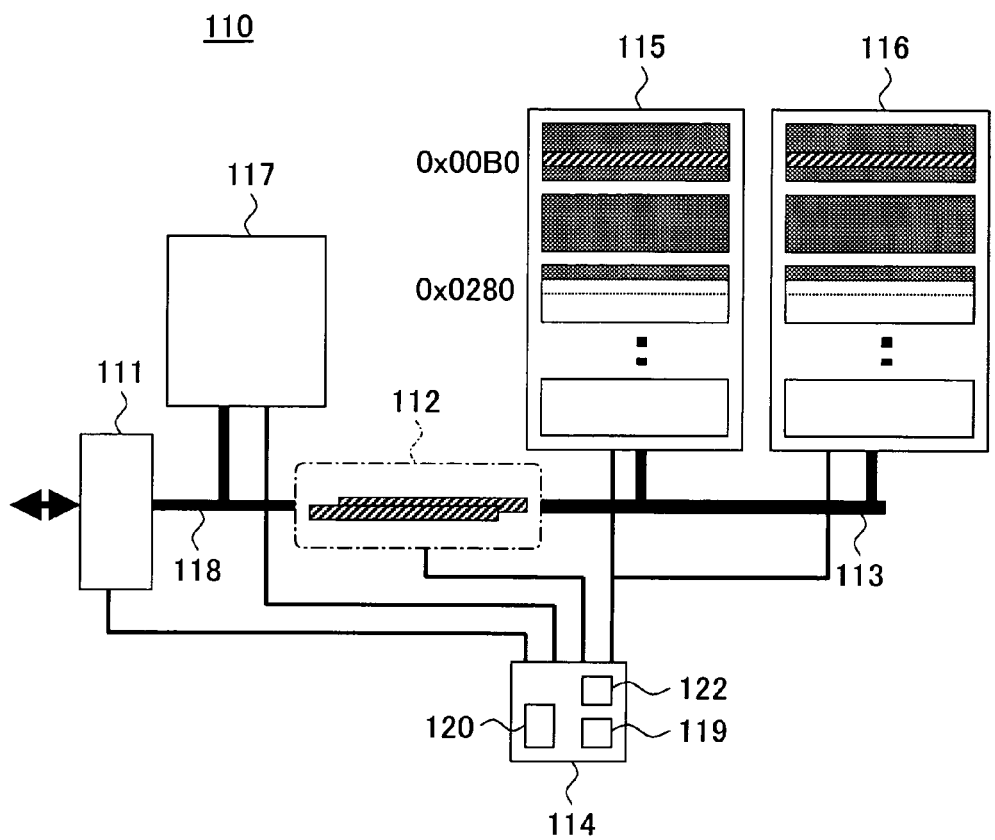
FIG. 12 is a view of the configuration showing a storage device according to a third embodiment.
Figure 13:
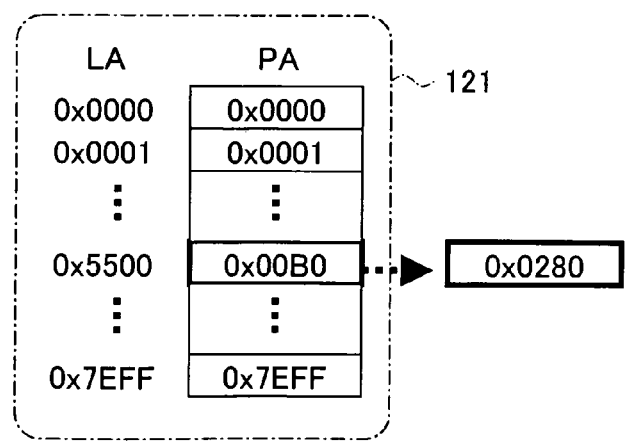
FIG. 13 is a diagram showing an example of the construction of an address conversion table of a control circuit according to a third embodiment of the present invention.

FIG. 12 is a view of the configuration showing the storage device according to the third embodiment of the present invention. Further, FIG. 13 is a diagram showing an example of the configuration of the address conversion table of the control circuit according to the third embodiment.

A storage device 110 of FIG. 12 has an interface circuit (I/F) 111, a page buffer 112, an internal data bus 113, a control circuit 114, NAND type flash memories 115 and 116, a cache memory 117, and a second internal data bus 118 as principal components.

In the storage device 110, the two chips of the NAND type flash memories 115 and 116 each having 16-bit input/outputs are connected in parallel to the 32-bit internal data bus 113. The two chips of the flash memories 115 and 116 are simultaneously accessed in parallel in a read or write operation. The page buffer 112 is a buffer for temporarily storing the accessed page region and is connected with the outside through the interface circuit 111. Further, the cache memory 117 is connected to the second internal data bus 118.

The control circuit 114 is a controller for managing the transfer of the data between the memory chips constituted by the flash memories 115 and 116 and the page buffer 112, the cache memory 117, and the interface circuit 111 and is controlled by the built-in CPU 119. In the similarly built-in RAM 120, a program region for controlling the CPU 119 and a work area are secured. At the same time, an address conversion table 121 is constructed. Further, to the control circuit 114, the control circuit 122 for controlling the data transfer between the cache memory 117 and the interface circuit 111 without the control of the CPU is mounted.

The storage device 110 is accessed basically in the same way as the first embodiment shown in FIG. 5. However, a portion of the data transferred between the external host computer and the flash memories 115 and 116 serving as the main storage of the storage device 110 is stored in the cache memory 117.

When the host computer accesses the storage device 110 again and tries to access the data of the same logical address as that stored in the cache memory 117, the data on the cache memory 117 side is accessed. Accordingly, during this period, none of the page buffer 112, internal data bus 113, and NAND type flash memories 115 and 116 is used for access. In the third embodiment, this period is therefore utilized for the restoration processing of invalid page regions.

Figure 14:
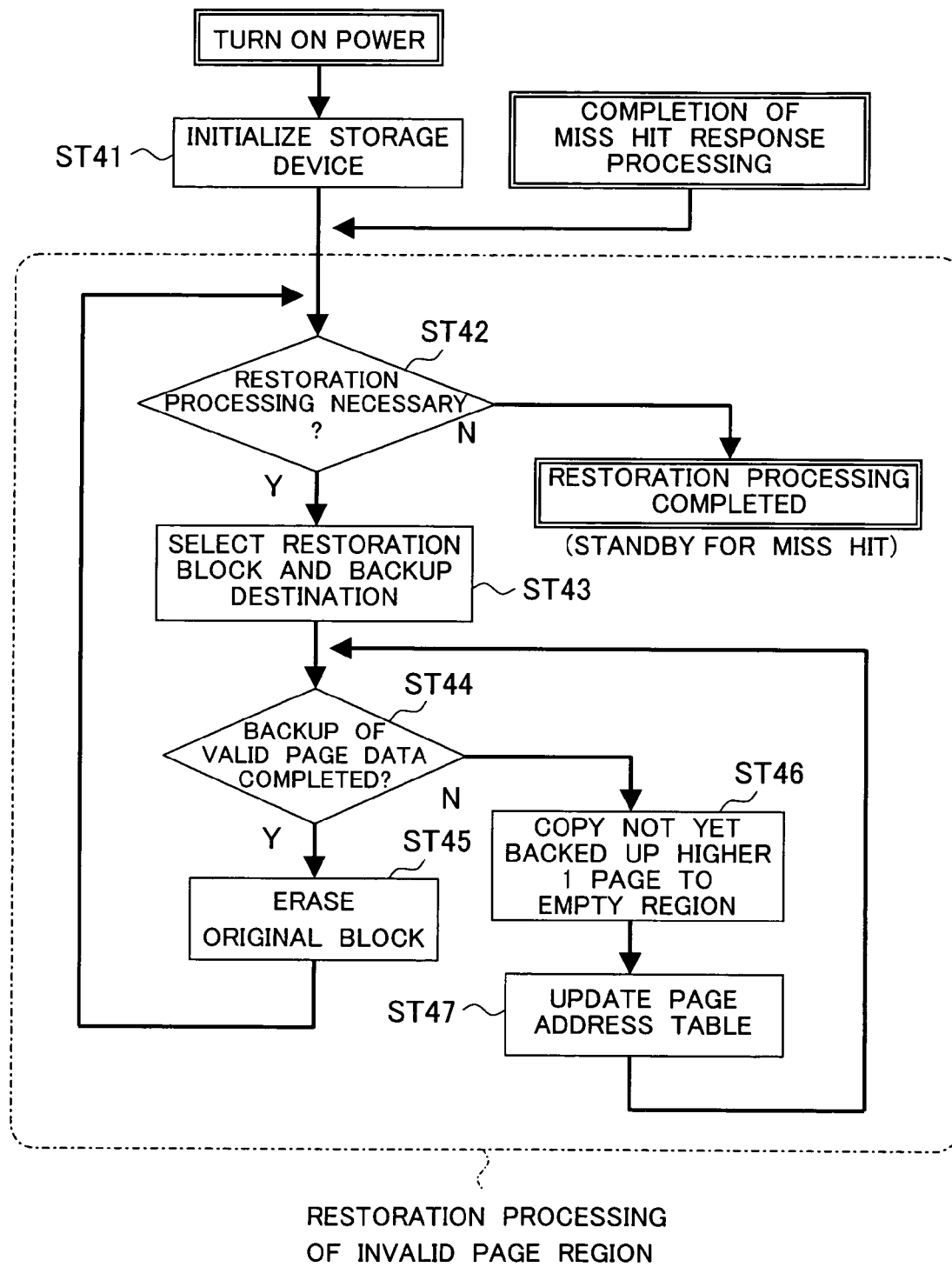
FIG. 14 is a flow chart for explaining the restoration processing according to the third embodiment.

FIG. 14 is a flow chart for explaining the restoration processing according to the third embodiment. In the figure, the restoration processing of invalid page regions indicated by the broken line is the same as the processing (tasks) ST2 to ST7 of FIG. 8 in the first embodiment.

In this example, in the same way as the first embodiment, the restoration processing is automatically executed when the device enters into the standby state, but the time when the restoration processing is interrupted due to an interruption is the time of a miss of the cache memory 117. In the period after startup of the device until access from the host computer hits the cache, the access processing is left to the control circuit 122, so the CPU 119 executes the restoration processing of the invalid page regions. When the cache is missed, the control circuit 122 interrupts the CPU 119, then the CPU 119 executes the processing for response to the miss in accordance with that. Specifically, it refers to the address conversion table 121 in response to the access request of the host computer, accesses the flash memories 115 and 116 from the physical addresses acquired there, and writes or reads the page data via the page buffer 112. Further, according to need, it caches the input data from the host computer or the output data to the host computer in the cache memory 117.

Note that preferably, in the same way as the first embodiment, when interrupting the restoration processing, the state of progress thereof is stored in the memory or register in the storage device, and the restoration processing is restarted based on that information when the restoration command is input again.

For example, when interrupted in the middle of the processing of steps ST42 to ST45, at least the location of the erasure block to be restored is stored as the progress information. Further, desirably, a flag indicating that the restoration processing is interrupted is set. Other than this, according to need, the location etc. of the empty region for backup of the valid pages or the pages being backed up may be stored. This information are stored in for example a suitable empty region in the RAM 120 in FIG. 12.

When the processing for response to the miss is completed, the access control is transferred to the control circuit 122 again, and the CPU 119 restarts the restoration processing from step ST42. At that time, at step ST42, it is judged that there was interrupted processing based on the flag described above, and the routine proceeds to the restoration processing. The erasure block to be restored and the empty region for backup are selected so as to continue the previous processing at step ST43. Further, at step ST44, it is checked and judged up to where the backup of the valid page data was completed at the time of the interruption or if the backup was already completed and the operation was interrupted in the middle of erasing the original block, then the restoration processing is executed from the uncompleted step according to that information.

In the third embodiment, the restoration processing ST42 to ST45 of the invalid page regions executed during the period where the cache is hit or at the time of standby was divided by interruption along with a miss of the cache. However, in the same way as the modification of the first embodiment, if previously dividing the restoration processing into smaller tasks and executing them as units, access can be quickly handled even if there is no interruption.

Figure 15:
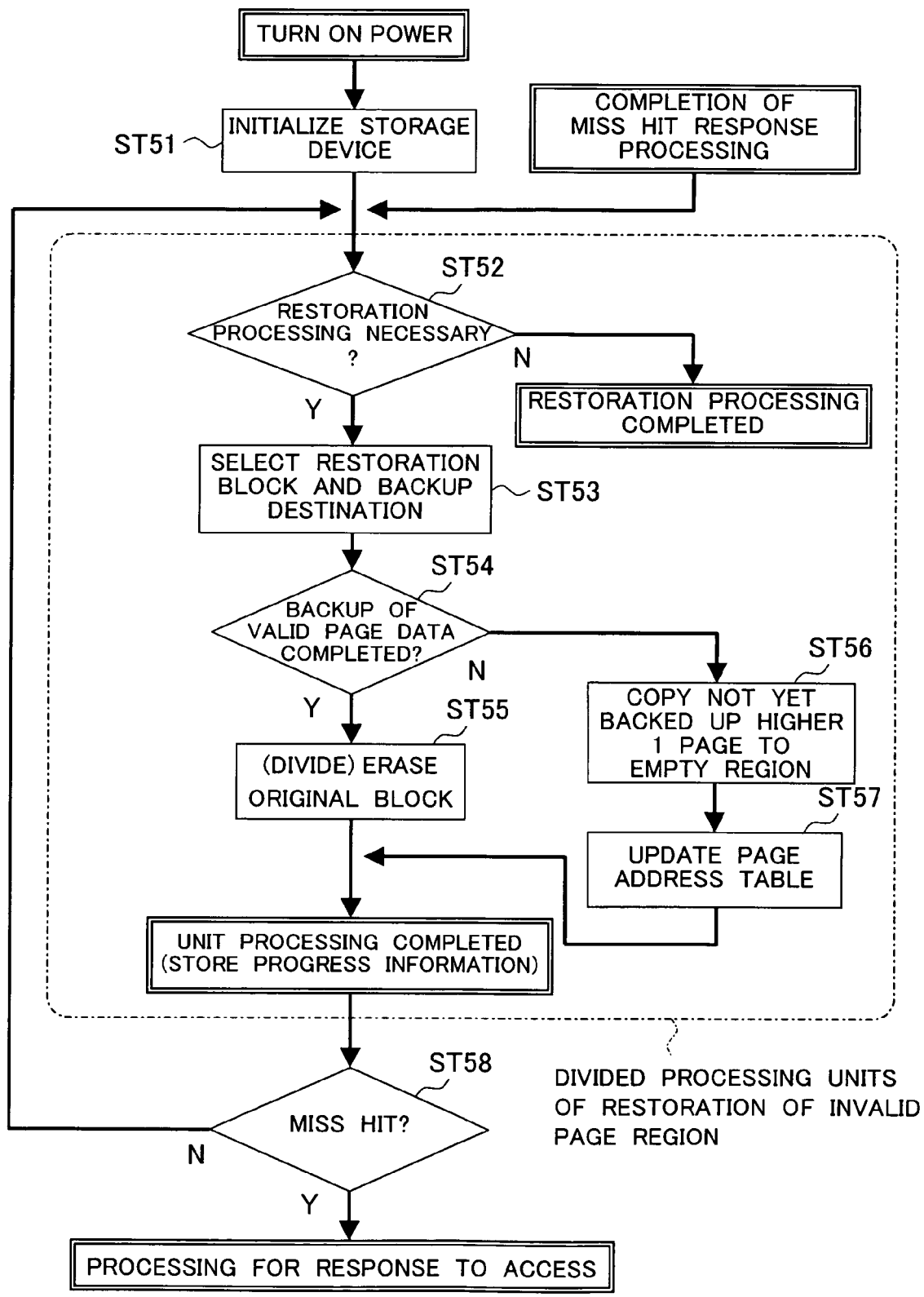
FIG. 15 is a flow chart for explaining divided processing units of restoration of an invalid page region of a modification of the third embodiment.

FIG. 15 is a flow chart for explaining the divided processing units of the invalid page region restoration according to a modification of the third embodiment. In the figure, the divided processing units of the invalid page region restoration indicated by the broken line are the same as the processing (tasks) ST12 to ST15 of FIG. 9 in the modification of the first embodiment.

Note that when the above divided processing units end or the restoration work of the invalid page regions at the erasure block level is not yet completed, the progress information of the restoration processing such as the erasure block being worked on or the cumulative time of the erasing according to need is desirably stored in the memory or register in the storage device.

In such divided processing units, the tasks may be terminated once for each processing, but in the case where there is no miss of the cache, the following divided processing units may be executed as in the figure.

Next, a different modification of the third embodiment using the divided processing units of the invalid page region restoration will be explained.

Figure 16:
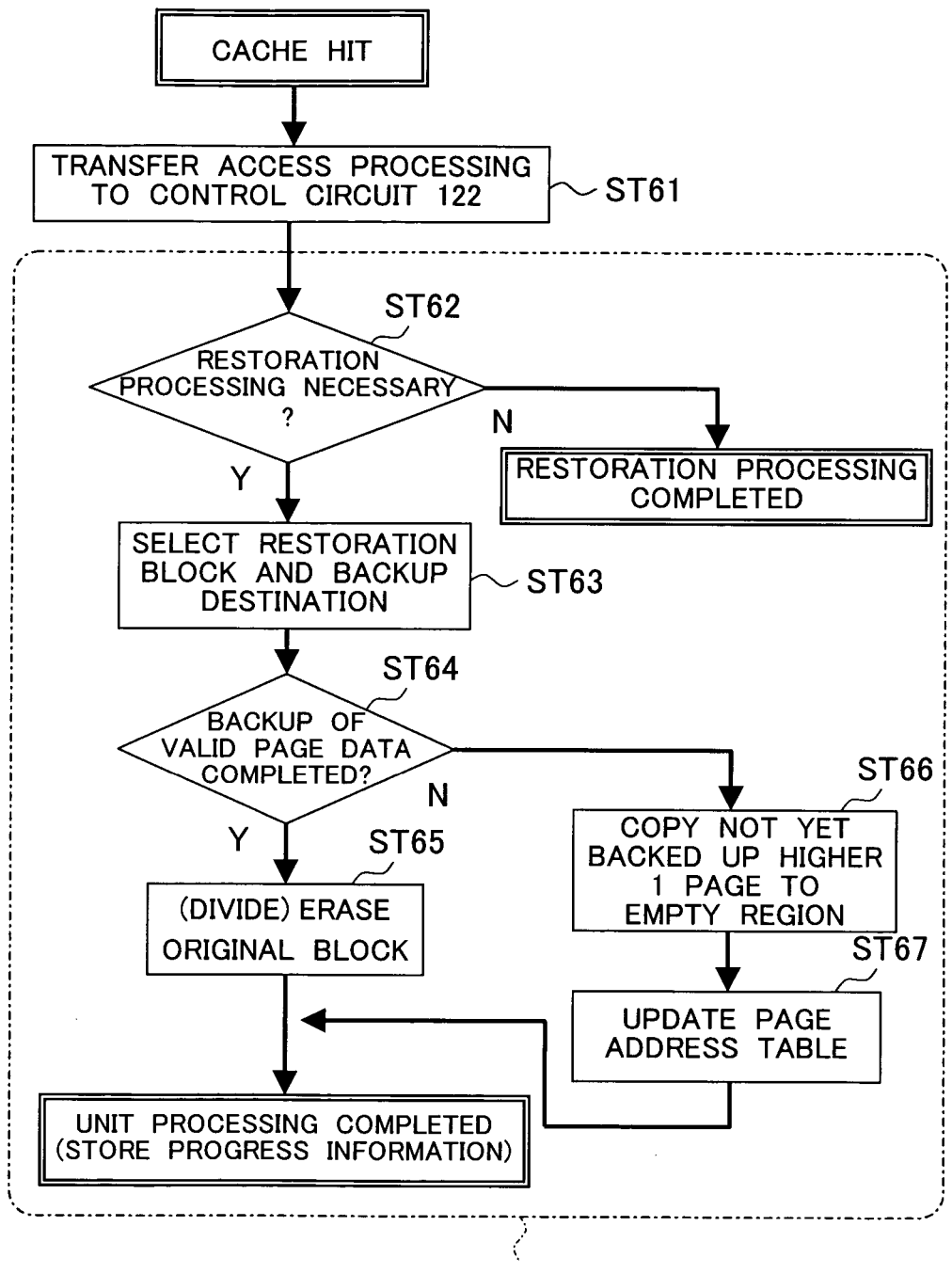
FIG. 16 is a flow chart for explaining divided processing units of restoration of an invalid page region of a second modification of the third embodiment.

FIG. 16 is a flow chart for explaining the divided processing units of the invalid page region restoration according to a second modification of the third embodiment.

Here, the restoration processing was executed using a cache hit as the start point. Namely, when access from the host computer hits the cache memory 117, the CPU 119 transfers the response to the access to the control circuit 122 (ST61) and executes the divided processing units of the invalid page region restoration. The divided processing units of the invalid page region restoration indicated by the broken line are the same as the processing (tasks) ST12 to ST17 of FIG. 9 in the modification of the first embodiment.

Above, three embodiments, that is, the first to third embodiments, were described in detail. When executing the restoration processing of invalid page regions by division in this way, the longest divided processing unit is the erasing of the block. For example, in a NAND type flash memory, copying one page takes about 150 to 200 micro ($\mu$) seconds, while erasing it takes 1 to 2 milli (m) seconds. Accordingly, the delay time at the time of access by the host computer becomes the worst at the time of erasure.

For example, where a program on the host computer performs a tasks by using the storage device, sometimes the worst delay is used as the criteria for estimating the margin of time for handling all tasks. In that case, the processing speed of the program ends up being greatly affected.

In order to deal with this, it is possible to limit the restoration processing performed during the period of access to only a page copy and to execute the block erasure all together at the time the power is turned on or off. When the power is turned on/off, the user is not bothered much at all by a delay of as much as 200 milli (m) seconds in terms of the sensed speed. Accordingly, it becomes possible to erase 100 blocks or more just at the time of turning the power on or off.

Alternatively, a command may be given for executing only the erasure of the not yet erased blocks. For example, when there is no input from the user for a while, if the host computer executes such a command, the user can erase blocks without feeling any delay.

An example of executing the erasing all together at the time of the power is turned on in the first embodiment will be explained as a fourth embodiment. The hardware configuration of the fourth embodiment is the same as that of FIG. 5 of the first embodiment.

Figure 17:
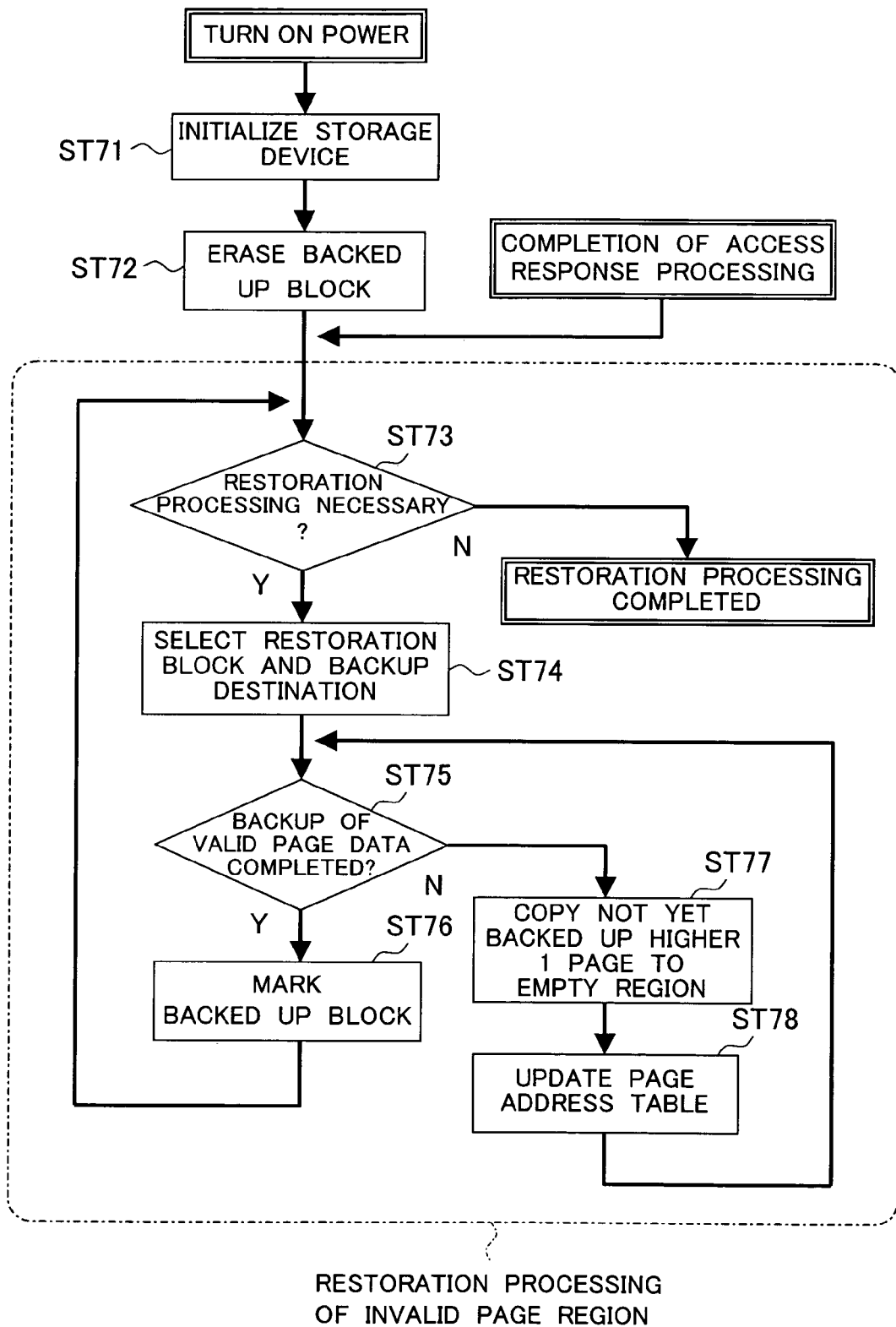
FIG. 17 is a flow chart for explaining the restoration processing of invalid regions of a fourth embodiment of the present invention.

FIG. 17 is a flow chart for explaining the restoration processing of invalid regions in the fourth embodiment.

When the storage device 70 is powered up and initialized as needed for access (ST71), first the already backed up blocks marked as being erasable in the device start to be erased (ST72). After the completion of this, the restoration processing of the invalid page regions is executed. This is comprised of a repetition of the processing flow of the following steps ST73 to ST76.

<Step ST73>

The invalidated page regions are searched for. Whether or not restoration processing is to be executed for them is judged by a suitable algorithm. If the restoration processing is unnecessary, the processing is terminated, and the device enters into the usual standby state of simply waiting for access and not executing any operation.

<Step ST74>

When it is judged that the restoration processing is necessary, the erasure block to be restored and the empty region for backup are selected, and the restoration processing is started.

<Step ST75>

It is judged whether or not there are any valid page regions to be backed up in the erasure block to be restored. If there are, that data is copied to empty regions one page region by one page region from the top (ST77). Each time the copying of a page is completed, the address conversion table is updated (ST78).

<Step ST76>

When the backup of all valid page regions is completed, the original block is marked as a "backed up block". As the technique of marking, a flag is set at for example the last page of the block or the physical address of the backed up block is stored somewhere in the device.

When an access command is input from the outside, the CPU is interrupted, and the control is transferred to the processing program responding to the access. In this case, when the writing of page data into the flash memory has been started, the processing is interrupted after the writing of that one page is completed and the address table is updated. Due to this, the access processing can be safely started with a delay of about several hundreds micro (μ) seconds.

While one example was shown above, needless to say all of the first to third embodiments and their modifications can be handled in the same way.

Note that, in the case explained above as well, when the number of the already erased blocks is insufficient at the time of rewriting from the host computer, desirably the erasing is executed at that point of time.

Above, concrete embodiments of the storage device using the present invention were explained, but the configuration inside the device can be modified in various ways. For example, the page buffer 72 in FIG. 5 may be constructed on the RAM 77 inside the control circuit 74. In such a case, the interface circuit 71, the flash memories 75 and 76, and the control circuit 74 are connected by the common internal data bus 73. Alternatively, an error correction circuit according to ECC is provided between the page buffer 72 and the flash memories 75 and 76, encoding is executed to add a parity bit at the time of writing page data from the page buffer to the flash memories, and decoding is carried out at the time of reading the page data from the flash memories to the page buffer. It is possible to apply the embodiments of the present invention irrespective of such a difference of the circuit configurations. Alternatively, as explained in the first to fourth embodiments, after executing the address conversion in units of pages according to the address conversion tables 78 and 121, address conversion at the block level may be further inserted in order to skip defective blocks in the flash memory. Even in such case, it is possible to apply the embodiments of the present invention without problem by the same control as in the above examples.

Up to here, the explanation was given of the case where the restoration processing mechanism was provided inside an independent storage device. However, it is also possible to manage such an address conversion table and execute the restoration processing under the control of the host computer side. Such a computer system is shown as a fifth embodiment in FIG. 18.

Figure 18:
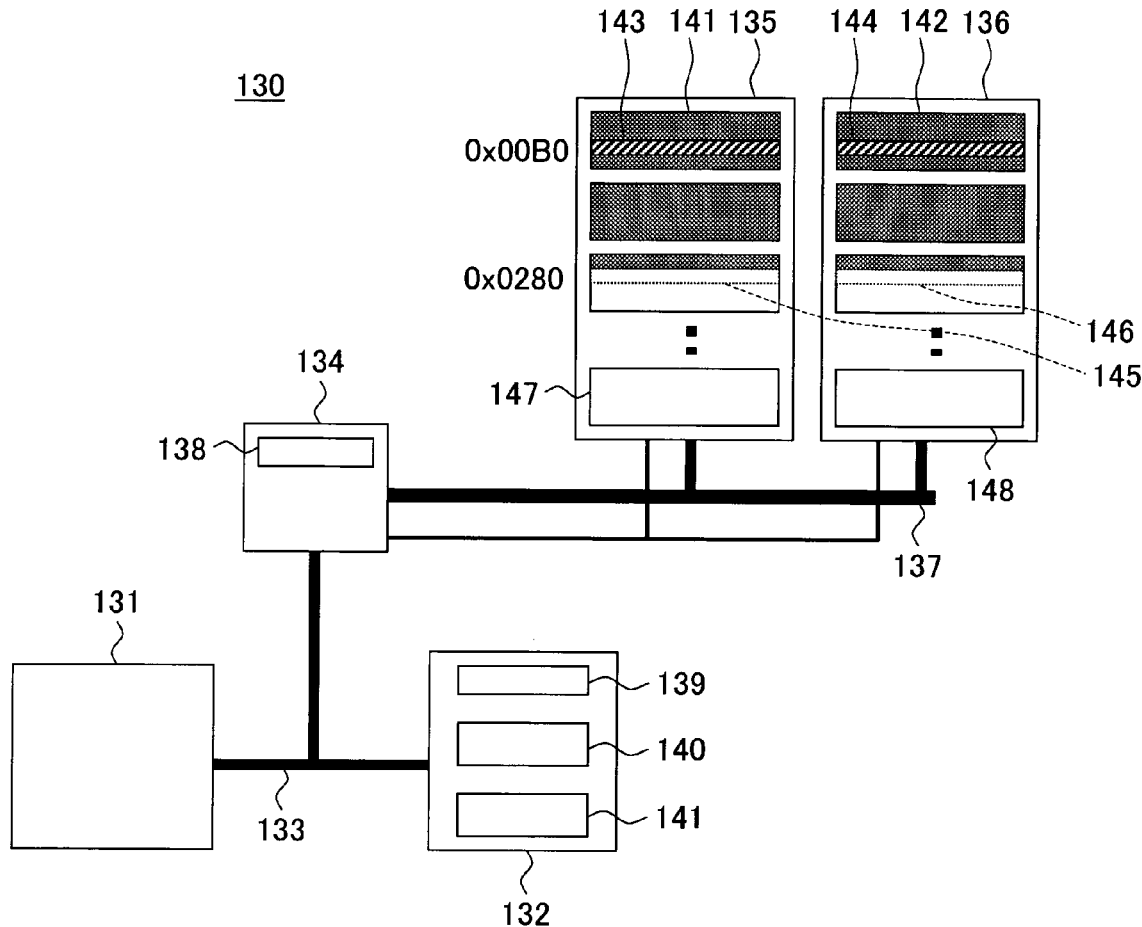
FIG. 18 is a diagram showing an example of the configuration of a computer system according to a fifth embodiment of the present invention.
Figure 19:
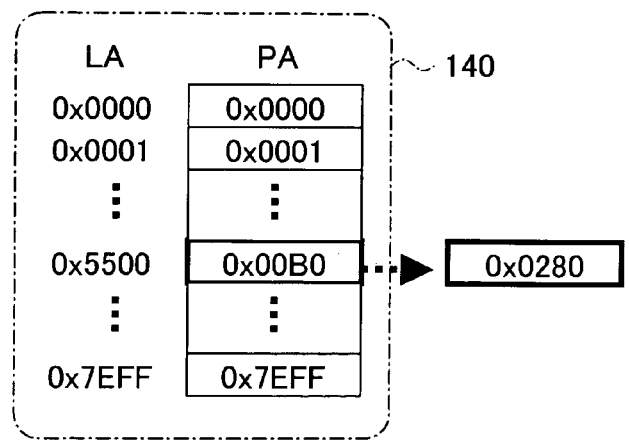
FIG. 19 is a diagram showing an example of the configuration of an address conversion table of a control circuit according to the fifth embodiment.

FIG. 18 is a diagram showing an example of the configuration of a computer system according to the fifth embodiment. Further, FIG. 19 is a diagram showing an example of the configuration of an address conversion table of the control circuit according to the fifth embodiment.

A computer system 130 of FIG. 18 has a CPU 131 as the processing unit, a RAM 132 as the system memory, a system bus 133, a bridge circuit 134, NAND type flash memories 135 and 136, a data bus 137, and a page buffer 138 as principal components.

The CPU 131 is connected via the 32-bit system bus 133 to the RAM 132 serving as the system memory. Further, the bridge circuit 134 is connected to the system bus 133. Two chips of NAND type flash memories 135 and 136 having 16-bit input/outputs are connected in parallel to the 32-bit data bus 137 linked with the bridge circuit 134. The two chips of the flash memories 135 and 136 are accessed simultaneously in parallel at the time of a read and write operation. The page buffer 138 is a buffer for temporarily storing the accessed page region and is built in the bridge circuit 134. The bridge circuit 134 receives various types of commands from the CPU 131 and mediates the transfer of the data between the flash memories 135 and 136 and the CPU 131 or the system memory 132 by using the page buffer 138. The commands received by the bridge circuit 134 are, other than access to predetermined pages of the flash memories 135 and 136, for example, erasing of predetermined blocks of the same flash memories, copying to designated addresses of the predetermined pages, and reset of the flash memories.

On the other hand, the system memory 132 has a driver 139 for controlling the above flash memory system. This driver 139 receives the access to the storage device from an operating system (OS) or application and converts the page address at the time of access with reference to the address conversion table 140 constructed in the same memory.

The memory system is accessed as follows. Here, for simplification, assume that addresses of the hexadecimal notation are assigned as follows. For example, when the external input address is "0x5500C", the higher "0x5500" is the page address, and the lower "0xC" is the sector address in the page region. The storage device can be randomly accessed in single sector units.

When the sector address of "0x5500C" is input from for example an application at the time of a read operation, the driver 139 receives the higher page address and acquires the physical page address (PA) "0x00B0" corresponding to the logical page address (LA) "0x5500" from the address conversion table 140. In this physical page address PA, the higher "0x00" is the addresses of the erasure blocks 141 and 142 in the memory chip flash memories 135 and 136. The lower "0xB0" is the addresses of the page regions 143 and 144 in the erasure blocks. Both of the memory chip flash memories 135 and 136 are accessed based on this physical address PA through the bridge circuit 134. The data of page regions 143 and 144 stored at the page addresses "0x00B0" are read out from these and stored in the page buffer 138. The bridge circuit 134 selects the sector corresponding to the lower address "0xC" from among those and outputs the same to the CPU 131 or the system memory 132.

On the other hand, when receiving a request from the application to write data to "0x5500C", first, by the same routine as a read operation, the address is converted by the driver 139, and the data of the page regions 143 and 144 are read out from the memory chip flash memories 135 and 136 and stored in the page buffer 138. Thereafter, the sector corresponding to the lower "0xC" is selected and updated to the new data. The updated page data is written back into the flash memories 135 and 136. The physical page address of this page region is "0x0280", that is, corresponds to the page of "0x80" in the erasure block "0x02". Further, up to before this processing, that region was the unused empty page which was not registered in any physical address field of the address conversion table 140. The updated data is written into this region in the form of an additional rewritting operation. At the same time, in the physical address field corresponding to the logical address "0x5500 of the address conversion table 140, the physical page addresses "0x0280" of the empty regions 145 and 146 are registered.

When performing an additional rewritting type write operation explained above, the page regions 143 and 144 corresponding to the physical page address "0x00B0" at which the data before updating were stored are deleted from the physical address field of the address conversion table 140 and invalidated. However, data are written in them, so they may be impossible to use as empty regions as they are. When the rewriting as explained above is repeated many times, many invalid page regions are generated. It is necessary to erase and restore these so that they can be used as empty regions again. Further, in that case, it is necessary to backup the valid data remaining in the erasure blocks 141 and 142.

Such restoration processing is carried out by the same algorithm as that explained above in relation to for example FIGS. 7A to 7C using the blocks 147 and 148 having empty regions. Namely, the data of valid page region groups on the erasure blocks 141 and 142 for restoration processing are sequentially copied to the empty regions in the backup destination blocks 147 and 148 from the top, and the physical addresses of the address conversion table 140 are updated in accordance with that. When copying of all of valid page data ends, the original blocks 141 and 142 are erased.

Note, in the fifth embodiment, this processing (tasks) is controlled by the driver 139 being used and the host CPU 131 sending the command to the bridge circuit 134. For example, the valid page data in the above restoration work is copied by the bridge circuit 134 reading out the predetermined page from the copying source to the page buffer 138 in response to a copy command from the host CPU 131 and writing it into the copying destination. Alternatively, a predetermined block is erased. At this time, the system bus 133 is not used, therefore, if necessary, the CPU 131 can also execute another processing (task) in parallel after transmitting the above command.

Figure 20:
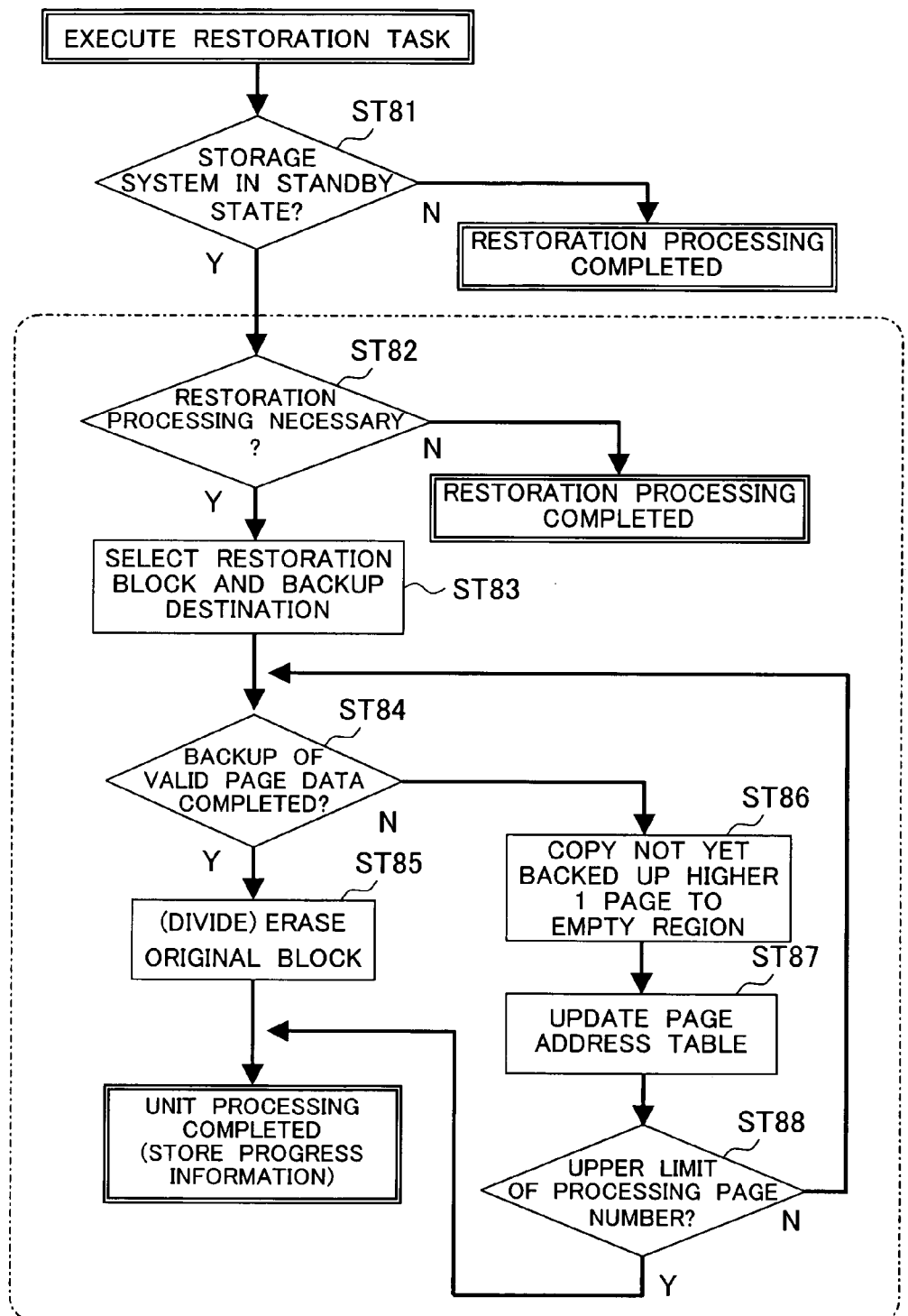
FIG. 20 is a flow chart showing an example of the restoration processing using a preemptive multi-task system.

FIG. 20 is a flow chart showing an example of the restoration processing using a preemptive multitask system.

The host CPU 131 executes the restoration task at an appropriate time in accordance with scheduling using a timer or priority order. Assume that a time slice of 5 milliseconds is assigned to each execution. The host computer divides and executes the restoration processing by using this assigned time.

When the restoration task is started, the host CPU 131 first inquires about the state of the storage system to the bridge circuit 134 and checks whether or not the storage system is in the middle of processing (task) (ST81). If in the middle of processing (task), the task ends, while when the storage system is in standby, the divided restoration processing of the invalid region as follows is executed according to the program of the driver 139.

<Step ST82>
The invalidated page regions are searched for and whether or not its restoration processing is to be executed is judged according to a suitable algorithm. Here, where there is remaining uncompleted restoration processing which had not been completed at the erasure block level, the routine proceeds to the continued processing of the same. When the restoration processing is unnecessary, the task is terminated.

<Step ST83>
When it is judged that the restoration processing is necessary, the erasure block to be restored and the empty region for backup are selected, and the restoration processing is started. When there is remaining uncompleted restoration processing, the erasure block being worked on and the empty region for backup are selected.

<Step ST84>
It is judged whether or not there is a valid page region to be backed up in the erasure block to be restored. If there is, the highest page is copied to the empty region from the top (ST86). Further, the address conversion table 140 is updated, then the divided processing unit is ended (ST87). Note that when 5 milliseconds are assigned for execution of one task as in the present example, a plurality of pages can be copied during that period. Accordingly, an upper limit of the processing page may be provided according to the assigned time slice (ST88). The copy processing may be repeated until the upper limit is reached.

<Step ST85>
When the backup of all valid page regions is completed, the original block is erased, then the divided processing unit is ended.

Note that when the above divided processing unit end and the restoration work of the invalid page regions at the erasure block level is incomplete, desirably the progress information of the restoration processing including the location of the erasure block being worked on is stored in for example the work area 141 of the system memory 132.

An example of the case of control of the restoration processing by the host computer was explained above, but in the same way as the case where the restoration processing mechanism was provided inside the storage device, there are various possible variations. As explained above, in addition to execution of another task in a time division manner as explained above, for example, the restoration processing may be started when there is no key input or mouse input from the user for a certain time and the restoration processing may be interrupted at the time when input is made. Alternatively, the erase processing of the block may be executed at the time of the system is turned on or off. In the middle, error correction according to the ECC or address conversion in units of blocks for avoiding defective block may be inserted. The control thereof may be carried out on the host computer side or carried out independently on the storage device side, for example, inside the bridge circuit 134.

When the restoration processing of the invalid regions as explained hitherto is executed by extracting a period for which there is no access to the flash memory, there is the following issue.

For example, in the case of a detachable storage device such as a memory card, even when the restoration processing is executed at the time of standby, the user himself has not explicitly instructed the access. Accordingly, there is a possibility that he or she will end up removing the card from the host computer. At that time, instantaneous disconnection of the power occurs in the storage device. Further, even with a built-in storage device, the power of the host device is sometimes suddenly cut due to the plug being pulled out of the socket etc.

At this time, if progress information of the restoration processing is stored in a volatile memory, it disappears. As a result, regions of an erasure block in the middle of being restored and backup regions fall into a very unstable state. Accordingly, in such a case, at least a portion of the state of progress of the restoration processing is desirably recorded in a nonvolatile RAM.

A nonvolatile RAM is a semiconductor memory which is nonvolatile, but is provided also with the property of a RAM enabling random access in 1 micro (μ) second or less. A ferro-electric RAM (FeRAM) using a ferroelectric film, a magnetic RAM (MRAM) using a ferromagnetic body, an ovonic unified memory (OUM) using a phase change material, an RRAM. etc. have been proposed.

An FeRAM is a semiconductor memory storing data according to the difference of polarization direction of a ferroelectric capacitor. For example, in U.S. Pat. No. 4,873, 664 of S. Sheffield et al. propose one aspect of this. An MRAM is a semiconductor memory storing data according to the difference of spin direction of a ferroelectric film. For example, ISSCC 2000, Technical Digest, p. 128, R. Scheuerlein et al. carries a paper on this. An OUM is a semiconductor memory storing data by phase transition of for example a chalcogenide film. For example, IEDM 2001, Technical Digest, p. 803, S. Lai et al., carries a paper on this. An RRAM is a semiconductor memory storing data by resistance hysteresis of a magnetoresistance effect material. For example, IEDM 2002, Technical Digest, 7.5, W. W. Zhuang et al. carries a paper on this. All of these nonvolatile memories have several orders higher performance than flash memories in the access speed at the cell level and the number of times of rewrites.

For example, in the case of the fifth and second embodiments related to FIG. 5, at least the address of the block in the middle the restoration processing must be stored. It must be stored in a nonvolatile RAM. Further, the address conversion table 78 and the page management table 86 include a portion of the progress information, therefore, are desirably stored in the nonvolatile RAM. For example, the RAM 77 of FIG. 5 is constructed as a mixture of an SRAM and nonvolatile RAM. The state of progress of the above restoration processing and various types of management tables may be constructed on the nonvolatile RAM side, and the firmware program for controlling the storage device and the work area may be constructed on the SRAM side.

The same circumstance is true for the other embodiments storing progress information in the restoration processing of invalid regions.

Figures 21, 22A, 22B:
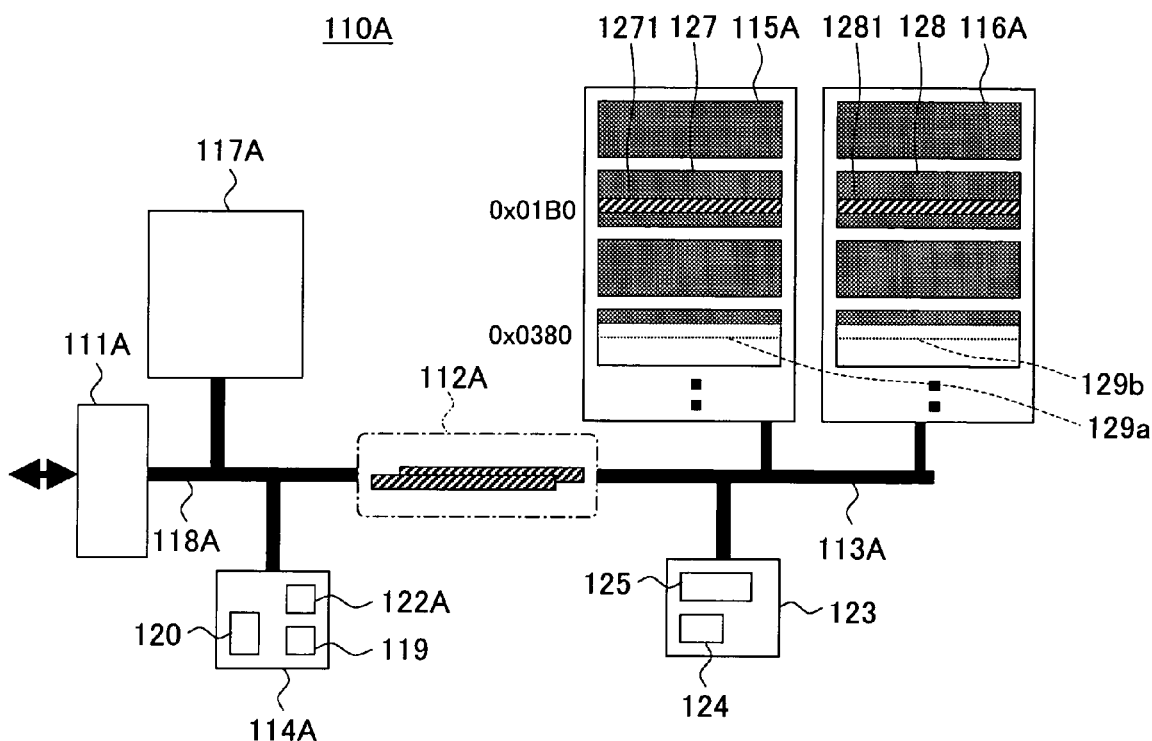
FIG. 21 is a diagram showing a modification of application on the hardware configuration of the third embodiment (FIG. 12) introducing ECC processing and defect block management as a sixth embodiment of the present invention.
FIGS. 22A and 22B are diagrams showing an example of the construction of an address conversion table and page state management table of the control circuit according to the sixth embodiment.

FIG. 21 is a diagram showing a modification of application on the hardware configuration of the third embodiment (FIG. 12) introducing such ECC processing and defect block management according to a sixth embodiment of the present invention. FIGS. 22A and 22B are diagrams showing an example of the configuration of the address conversion table and the page state management table of the control circuit according to the sixth embodiment.

In a storage device 110A, two chips of NAND type flash memories 115A and 116A each having 16-bit input/outputs are connected in parallel to a 32-bit internal data bus 113A. The two chips of flash memories 115A and 116A are accessed simultaneously in parallel in a read or write operation. The page buffer 112A is a buffer for temporarily storing an accessed page region and is connected with the interface circuit 111A with the outside via a second internal data bus 118A. Further, a cache memory 117A is connected to the second internal data bus 118A.

The control circuit 123 controls the transfer between the flash memories 115A and 116A and the page buffer 112A. In the control circuit 123, an address conversion table 126 is constructed on the built-in RAM 124 for address conversion in units of blocks so as to skip defective blocks in the flash memory so they are not accessed. Further, in the control circuit 123, an ECC circuit 125 is mounted. When data is written into the flash memories 115A and 116A from the page buffer 112A, a parity bit is added by encoding. Error correction by decoding is carried out when the data is read out from the flash memories 115A and 116A to the page buffer 112A.

The control circuit 114A is a controller for managing the transfer of the data among the page buffer 112A, the cache memory 117A, and the interface circuit 111A and is controlled by the built-in CPU 119A. In the same way, in the RAM 120A, the program region for controlling the CPU 119A and the work area are secured and at the same time, the address conversion table 121A is constructed. Further, the control circuit 114A is provided with a control circuit 122A for controlling the data transfer between the cache memory 117A and the interface circuit 111A without the control of the CPU 119A. Note that, the control lines are not illustrated in the present drawing.

The main difference of the sixth embodiment from the third embodiment (FIG. 12) is that a dedicated control circuit 123 holding the address conversion table 126 and the ECC circuit 125 is provided for transfer of data between the page buffer 112A and the flash memories 115A and 116A. Due to this, the logical address input from the outside is doubly converted by the address conversion tables 121A and 126 when the flash memories 115A and 116A are accessed based on that. Further, the input/output data is converted by encoding and decoding by ECC. The concrete operation will be explained below.

At the time of a read operation, when the sector address of "0x5500C" is input from the outside, the control circuit 114 receives the higher page address to access the built-in RAM 120A and acquires the physical page address (PPA) "0x00B0" corresponding to the logical page address (LPA) "0x5500" from the address conversion table 121A. In this physical page address PA, the higher "0x00" is the addresses of the erasure blocks. When it is further input to the control circuit 123, this portion is handled as the LOGICAL BLOCK ADDRESS (LBA), and the PHYSICAL BLOCK ADDRESS (PPA) "0x01" is acquired from the address conversion table 126. These are addresses of erasure blocks 127 and 128 in the memory chip flash memories 115A and 116A.

On the other hand, the lower "0xB0" is the addresses of the page regions 1271 and 1281 in the erasure blocks 127 and 128. Both of the flash memories 115A and 116A are accessed based on this physical address. The data of page regions 1271 and 1281 stored at the page addresses "0x01B0" are read out from these, encoded by ECC, and stored in the page buffer 112A.

On the other hand, when writing data to "0x5500C" from the outside, first, the data of page regions 1271 and 1281 are read out from the memory chip flash memories 115A and 116A by the same routine as that at the time of a read operation and stored in the page buffer 112A. Thereafter, the desired location in the buffer is updated to the write data. The updated page data is written back into the flash memories 115A and 116A. At that time, the page regions 1271 and 1281 of the read out side are not rewritten. The data are written into an unused empty page which was not registered in any physical address field of the address conversion table 121A. Such empty pages are managed on the control circuit 114A side. For example, the management table 86 as in FIG. 6 is used, and physical page address "0x0280" is selected. When the higher "0x02" among this is input to the control circuit 123, it is converted to "0x03" from the address conversion table 126, and the already updated data of the page buffer 112A are written and transferred to page regions 129a and 129b of the memory chip flash memories 115A and 116A from the combined address "0x0380". At this time, the parity bit of ECC encoding is added to the data.

On the other hand, the control circuit 114A registers "0x0280" in the field of the physical page address corresponding to the logical page address "0x5500" of the address conversion table 121A and manages the original physical page address "0x00B0" as the invalidated page region. All of the page addresses point to the correct page regions on the flash memories 115A and 116A when converted through the control circuit 123.

In the sixth embodiment, they physical page addresses derived by the control circuit 114A are converted at the one-to-one block level by the control circuit 123, but at that time, the relative locations of the pages in the same block do no change at all. Accordingly, from the control circuit 114A, the various types of conversions applied by the control circuit 123 may be regarded as a "black box". Namely, the control circuit 114A regards the memory chip flash memories 115A and 116A and the control circuit 123 as a single integrated flash memory device. Even if accessing these by independent logic, no inconsistency occurs. The same is true also for encoding and decoding by ECC. As a result, the control circuit 114A becomes able to execute the restoration processing of the invalidated regions by exactly the same algorithm as that of the third embodiment.

Next, a storage device having the function of reading at least a portion of each data region before erasing an erasure block, judging whether or not valid data is recorded in each data region from the read value, and, when the result of judgment is that valid data is recorded, copying the data of the data region to another erasure block will be explained. For example, the first embodiment of FIG. 5 used a "Page State" flag of table 86 for the judgment of whether each data region was invalid or valid when restoring an invalid region. However, if such a flag is provided for each data region, the table 86 will occupy a considerably large part of the RAM. Accordingly, when such a flag is abolished and the validity of a data region is judged by a different method, more of the RAM capacity can be saved. This is also advantageous in terms of cost. The present storage device was devised from such a demand.

Figure 23:
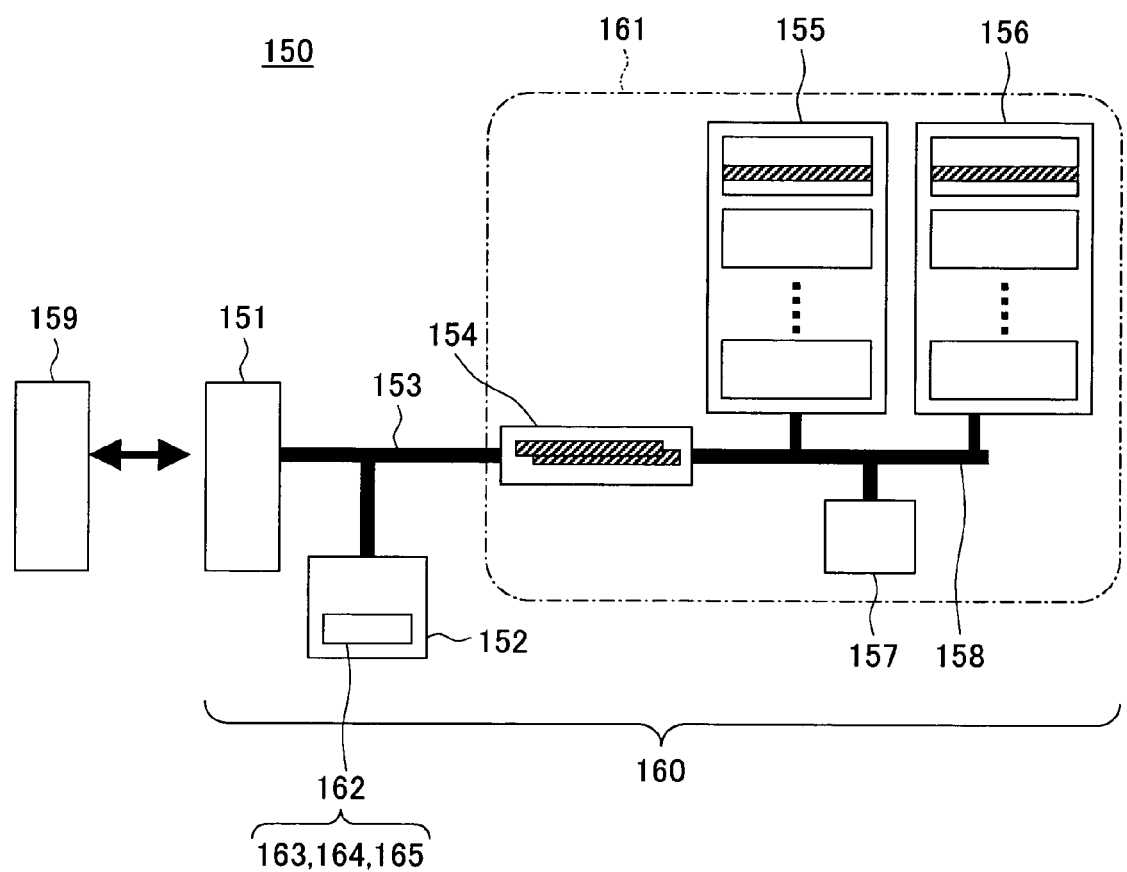
FIG. 23 is a diagram showing an example of the configuration of a computer system (storage system) according to a seventh embodiment of the present invention.
Figure 24:
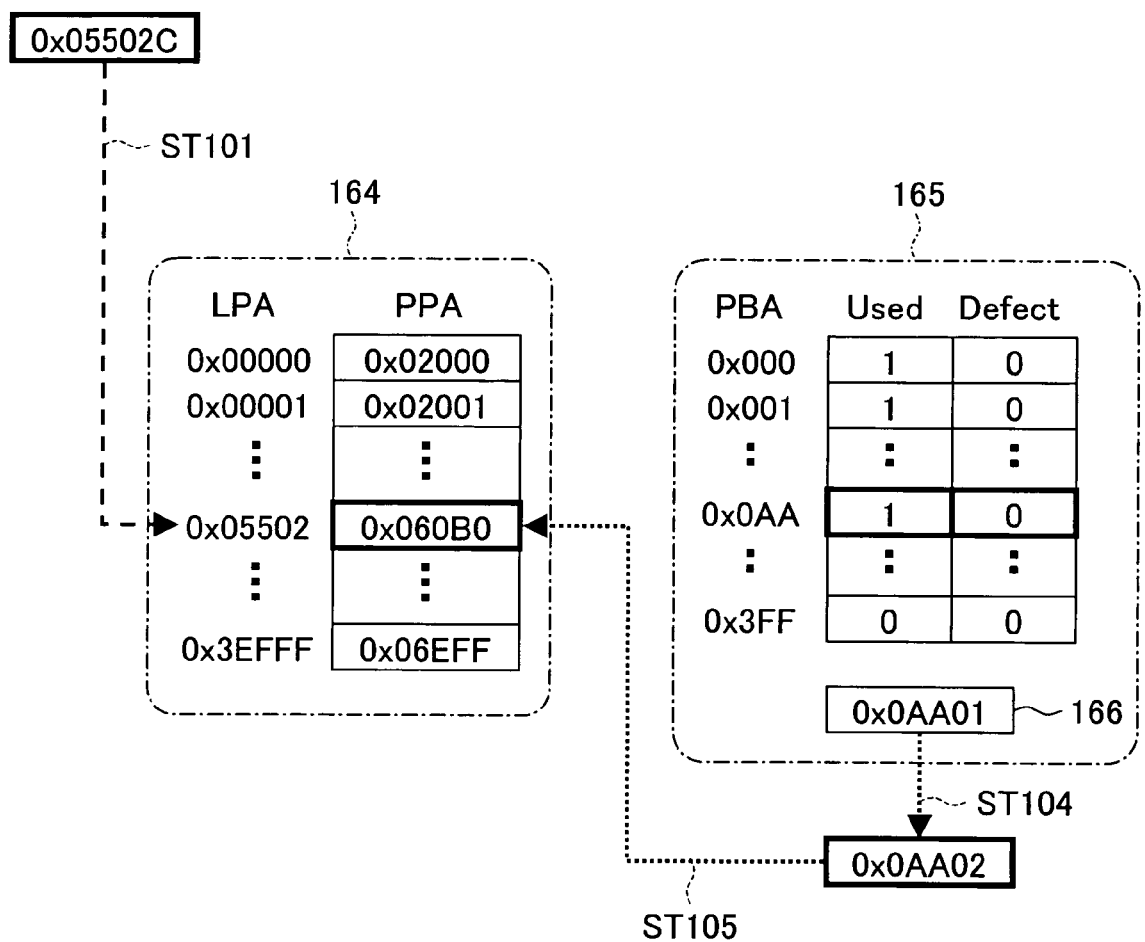
FIG. 24 is a diagram showing an example of the construction of an address conversion table and address search table of a control circuit according to a seventh embodiment of the present invention.

FIG. 23 is a diagram showing an example of the configuration of a computer system (storage system) according to a seventh embodiment. Further, FIG. 24 is a diagram showing an example of the configuration of the address conversion table and the address search table of the control circuit according to the seventh embodiment.

The computer system 150 is configured by an interface circuit (I/F) 151, a control circuit 152, an internal bus 153, a page buffer 154, NAND type flash memories 155 and 156, a control circuit 157, a memory bus 158, and a host system 159.

Among these components, the interface circuit (I/F) 151, control circuit 152, internal bus 153, page buffer 154, NAND type flash memories 155 and 156, control circuit 157, and memory bus 158 configure a file storage system 160. In the file storage system 160, the page buffer 154, NAND type flash memories 155 and 156, control circuit 157, and memory bus 158 configure a flash memory device 161. Further, the control circuit 152 has a built-in RAM 162. In the RAM 162, a working area 163, an address conversion table 164, and an address search table 165 are formed.

Inside the file storage system 160, two chips of 8 Gb NAND type flash memories 155 and 156 each having 16-bit input/outputs are connected in parallel to the 32-bit memory bus 158. The two chips of the flash memories 155 and 156 are accessed simultaneously in parallel at the time of a read or write operation. Namely, the memory bus 158 has configured of two channels of 16-bit buses. Each of the flash memories 155 and 156 performs access for write or read operations in units of pages of for example 4 kB. Accordingly, as the actual page size, 8 kB are accessed all together. The page buffer 154 is a page buffer for temporarily storing the data of the accessed page region. The transmission and reception of the data between the flash memories 155 and 156 and the page buffer 154 are controlled by the control circuit 157. The control circuit 157 applies error correction by ECC encoding to the transfer data according to need. Both the flash memories 155 and 156 input/output data with the internal bus 153 of the file storage system 160 via the page buffer 154. Namely, the above group of circuits substantially configures one flash memory device 161 and can be regarded as being connected to the internal bus 153 of the file storage system 160. The total capacity thereof is 16 Gb (2 GB), while the actual page size is 8 kB. Namely, 256 k of page data is stored in the device.

Further, the interface circuit 151 and the control circuit 152 are connected to the internal bus 153. The interface circuit 151 transmits and receives data and commands with the host system 159 according to the ATA, PCI express, or other standard. The control circuit 152 manages the transmission and reception of the data between the page buffer 154 and the interface circuit 151 inside the file storage system 160. In the RAM 162 built in the control circuit 152, a code area and a work area 163 for executing the program are provided. Further, an address conversion table 164 for managing virtual addresses in units of pages and an address search table 165 for retrieving normal empty blocks are constructed.

In the computer system 150, the host system 159 is controlled by the built-in CPU, and the user data is stored in the flash memory device 161 via the file storage system 160 in response to a request of the application or operating system. The control circuit 152 mediates the data transfer during that and manages access involving address conversion etc. by using the address conversion table 164.

The file storage system 160 uses a sector of 512 Bytes as the access unit in the same way as a hard disk drive. In the system, for simplification, assume that addresses of the hexadecimal notation are assigned as follows. For example, when the external input address is "0x05502C", the higher 20 bits of "0x05502" are the page addresses, so 1M pages can be managed at the maximum. On the other hand, the "0xC" of the lower 4 bits are sector addresses in the page regions. One page includes 16 sectors. The storage device 160 can perform random access in units of sectors by selecting the data in the page buffer 154.

Below, the internal operation of such a storage device 160 will be explained.

Figure 25:
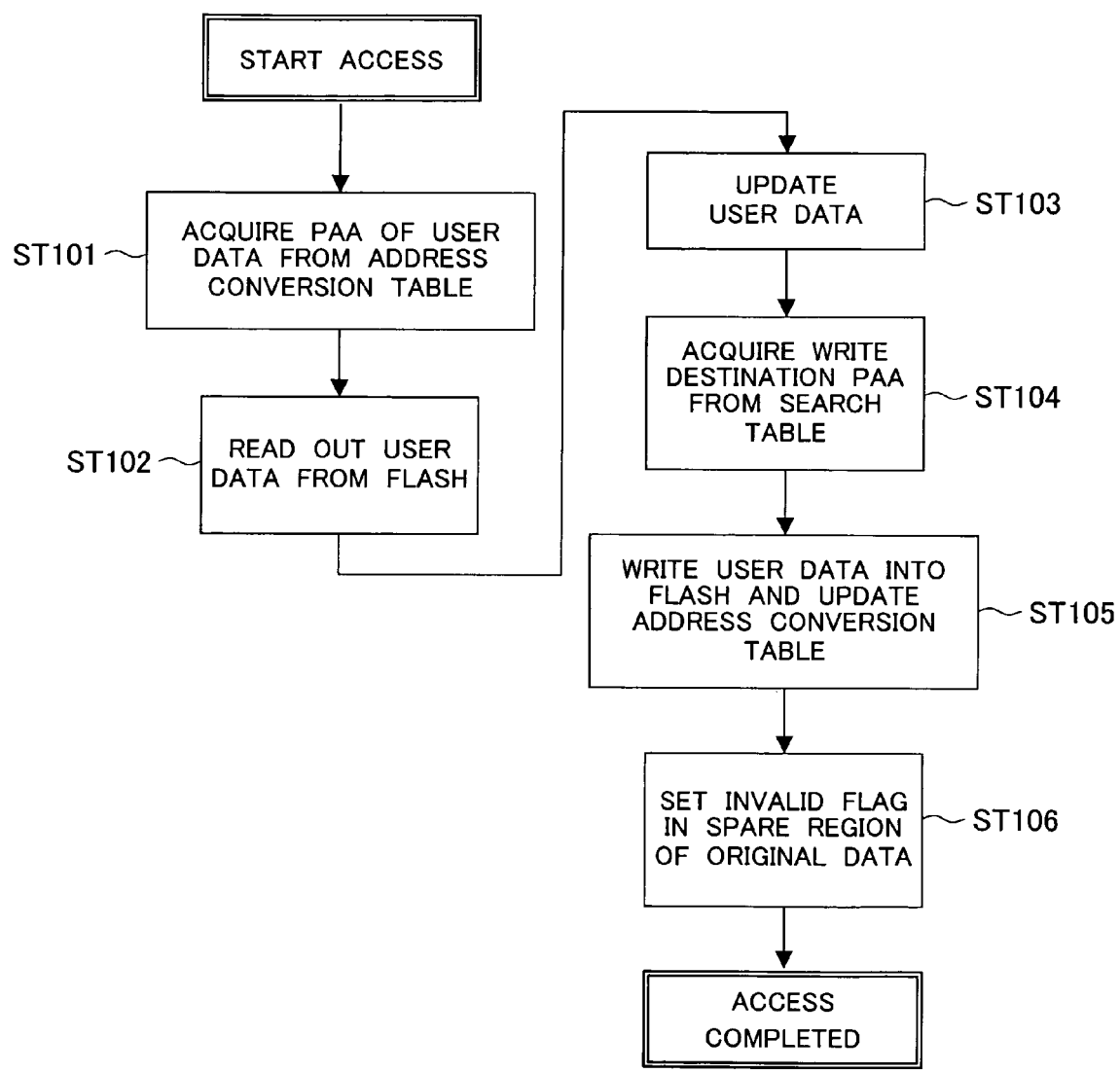
FIG. 25 is a flow chart for explaining data access processing using the address conversion table and the search table of FIG. 24.

In the seventh embodiment, virtual address management in units of pages is employed. FIG. 25 is a flow chart for explaining data access processing using the address conversion table and the search table of FIG. 24. The concrete access to the flash memory device 161 inside the file storage system 160 is executed by the following routine according to the flow chart of FIG. 25.

<Step ST101>

When the sector address of "0x05502C" is input from the host system 159 together with the access command of the user data, the control circuit 152 refers to the address conversion table 164 using the logical page address (LPA) "0x05502" as the index and acquires the physical page address (PPA) "0x060B0" of the user data to be accessed.

<Step ST102>

The flash memory device 161 is accessed by the above physical page address, and the page group where the user data is stored in the page buffer 154 is read out. Thereafter, the portion corresponding to the sector address "0xC" is selectively output from the page buffer 154 to the host system 159, whereby the read operation is completed.

Further, the data is updated as follows. Assume that the sector of the same "0x05502C" is updated. In that case, first, it is necessary to read out the desired page to the page buffer 154. The routine is the same as steps ST101 and ST102. In the same way as the time of reading of steps ST101 and ST102, the desired data read out from the flash memory device 161 is stored in the page buffer 154.

<Step ST103>

The desired sector portion is updated on the page buffer 154.

<Step ST104>

As the write destination of the updated user data to the flash memory device 161, the physical page address (PPA) of the appropriate page regions is selected from the address search table 165 and the register 166 (FIG. 24) in the RAM 162. Here, for simplification, assume that the physical page address is formed by the physical block address portion (PBA) of the higher 12 bits and the page offset portion of the lower 8 bits. At this time, each erasure block is comprised of 256 pages (28). In the address search table 165, each block is marked by the "Used Flag" if it is being used at present or if it is in the already erased empty state. Further, in the case of a defect block, the "Defect Flag" has become "1". Data is sequentially written from the head page of an already erased block. The physical address of the page written the previous time is stored in the register 166. As the write destination, pages incremented from that are sequentially selected. When the selection reaches the tail of the block, the "Used Flag" and "Defect Flag" of the following blocks are scanned, the next unused and good block is detected, and the head page thereof is selected. The value of the register 166 is "0x0AA01" at present, so the control circuit 152 first selects the physical page address "0x0AA02" incremented from that as the write destination of the user data.

<Step ST105>

The flash memory device 161 is accessed with the above physical page address, and the user data in the page buffer 154 are written into the flash memory device 161 all together. When the writing is completed, the address conversion table 164 is updated, and the physical page address (PPA) corresponding to the logical page address (LPA) "0x05502" is updated to "0x0AA02". Along with this, the page regions corresponding to the old physical page address "0x060B0" become invalid.

<Step ST106>

Further, a predetermined value is written into the spare region of the page "0x060B0" of the invalidated old data to make it as invalid. Note that such work is not executed in a flash memory in which the writing order of pages in blocks is restricted. The method to deal with this will be explained later.

When performing an additional rewriting type write operation as explained above, the page regions corresponding to the physical page address "0x060B0" in which the data before update was stored are deleted from the physical address field of the address conversion table 164 and no longer can be accessed from the outside. Namely, they are invalidated. However, data is written in those. They will not be used as empty regions as they are. When repeating the rewrite operation as explained above many times, many invalid page regions are generated. It is necessary to erase and restore those so that they can be used as empty regions again. In that case, it is necessary to backup the other valid data remaining in the erasure block "0x060".

In such restoration processing, for example, first, the valid data in the target block may be once read out to the page buffer in the same way as the time of updating and then written into an empty region of another block by an additional rewritting operation to thereby substantially back it up. Namely, by temporarily updating the valid pages, the original regions thereof are all invalidated. Thereafter, by erasing the target block, the restoration processing is executed.

Figure 26A:
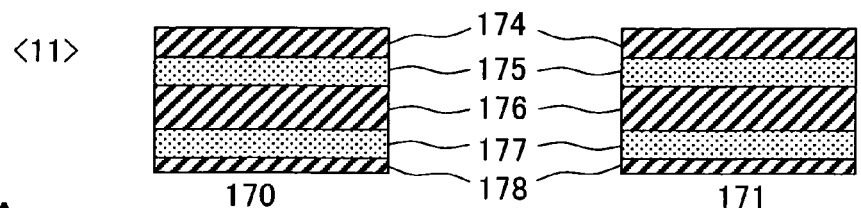
FIGS. 26A to 26C are diagrams for explaining the routine for restoration of an invalid region according to the seventh embodiment.
Figure 26B:
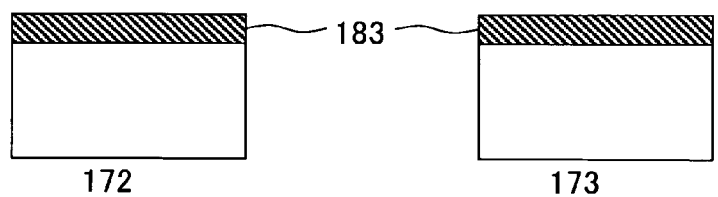
Figure 26B:
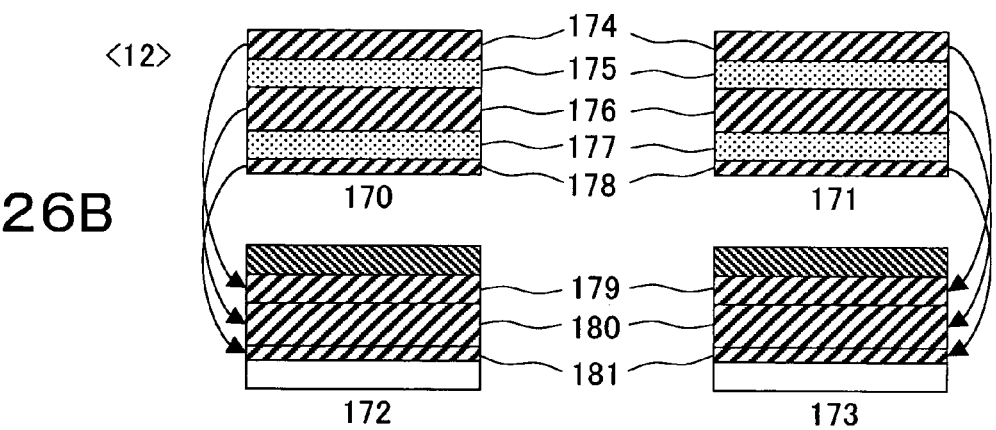
Figure 26C:
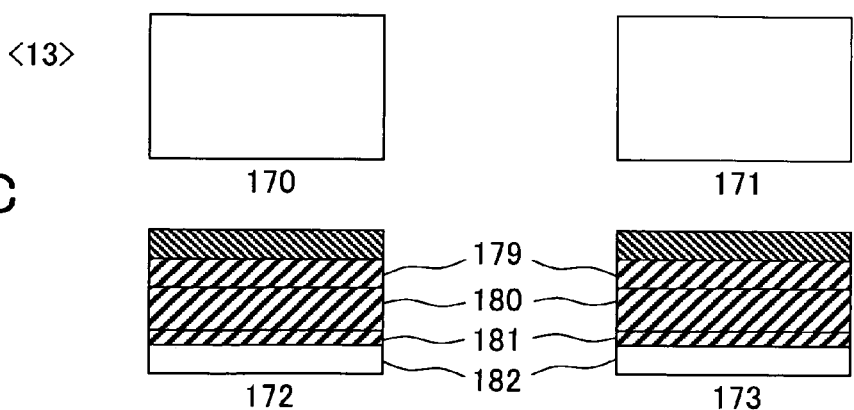

FIGS. 26A to 26C are diagrams for explaining a restoration routine of invalid regions according to the seventh embodiment. FIGS. 26A to 26C conceptually illustrate a routine for backing up the valid data inside the erasure blocks 170 and 171 and substantially restoring the invalid page regions.

Routine <11>

Assume that rewriting by the additional rewritting operation as explained above is under way, the data are once written into the erasure blocks 170 and 171, then the group of page regions 175 and 177 invalidated by updating coexist with the group of valid page regions 174, 176, and 178. Here, it is necessary to restore the invalidated regions to the empty regions while leaving the data of the valid page regions. On the other hand, the blocks 172 and 173 are erasure blocks used as the empty regions for the additional rewritting operation at present. The data is written up to the page region 183.

Routine <12>

The group of valid page regions 174, 176, and 178 are sequentially copied to the empty regions 179, 180, and 181 in the erasure blocks 172 and 173 from the top. On the other hand, group of the invalid page regions 175 and 177 are not copied. The judgment of the valid pages and the invalid pages is executed by reading the spare regions of pages from the erasure blocks 172 and 173 into the page buffer 154 of FIG. 23 first based on that value. Details thereof will be explained later. When the result of judgment is a valid page, the entire data in the target page is read into the page buffer 154 and written into the erasure blocks 172 and 173. At the same time, the address conversion table 164 is updated. Namely, the physical page address of the copying destination is registered in the physical address field corresponding to the logical address of each page region. This operation is equivalent to the work of rewriting the group of valid page regions 174, 176, and 178 by the additional rewritting method. In actuality, the data are not rewritten, but only copied, but all pages in the erasure blocks 170 and 171 are invalidated by this work. The data of the valid page regions are substantially backed up to the erasure blocks 172 and 173.

Routine <13>

The erasure blocks 170 and 171 are erased. With this, the internal portions thereof all become empty regions which can be used for the additional rewritting operations later. With this, the invalid regions 175 and 177 are effectively restored.

In this way, the restoration processing of the invalid page regions is comprised of the backup processing by copying of valid page regions and the erasing of original erasure blocks. Further, by applying dummy updating to the valid pages in an erasure block to be restored by the same routine as the usual update processing and backing up pages by that, it is possible to combine the backup of valid pages at the time of the restoration processing with the usual write algorithm. In this case, not only does the control become easy, but also various types of tricks for improving the reliability at the time of writing, for example, standardization of write operations into the flash memories, can be applied also the restoration processing, so the total reliability of the storage device can be improved.

Figure 27:
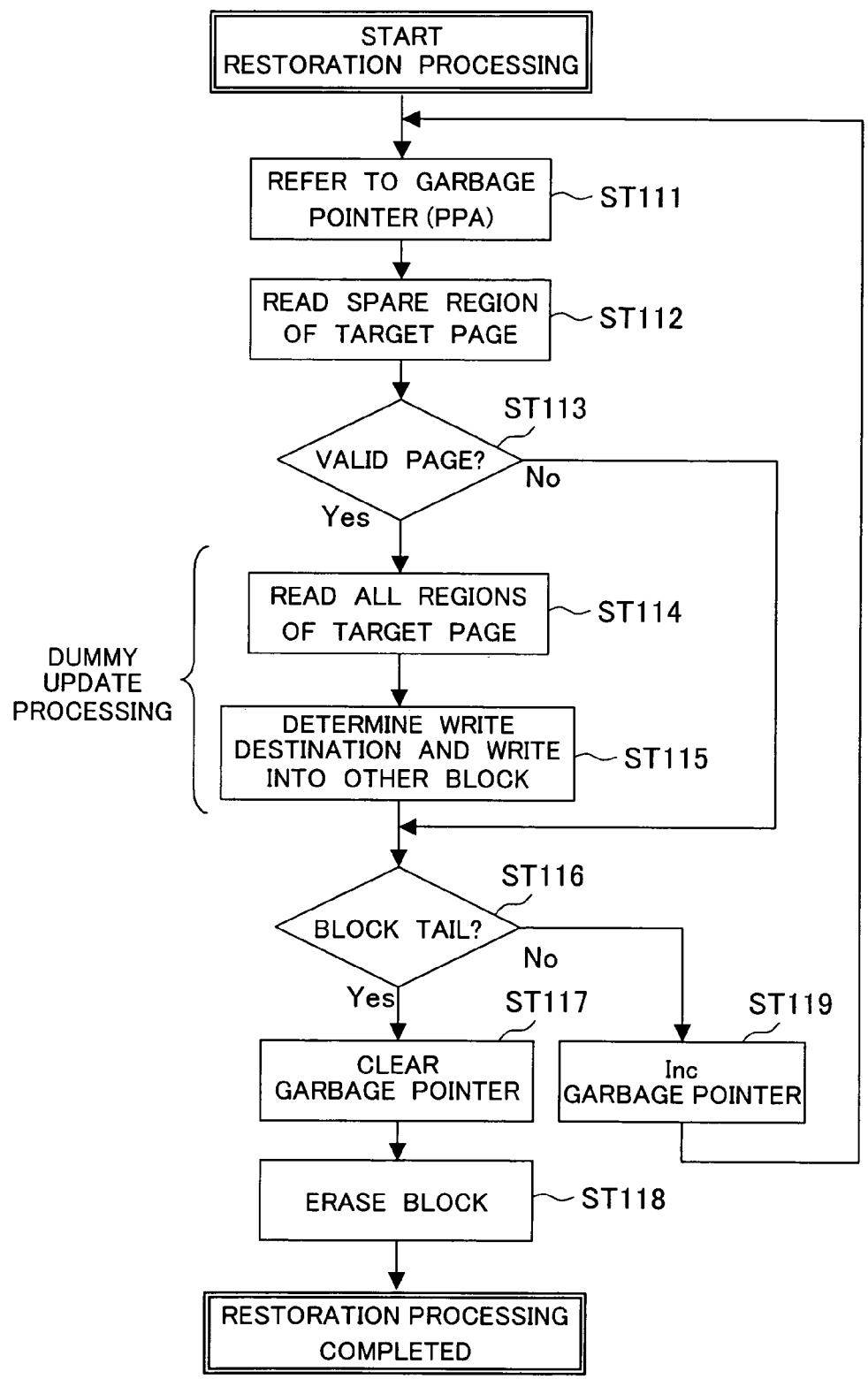
FIG. 27 is a flow chart for explaining the concrete restoration processing in the seventh embodiment.

FIG. 27 is a flow chart for explaining the concrete restoration processing in the seventh embodiment.

<Step ST111>

A garbage pointer is referred to. A "garbage pointer" indicates the physical address (PPA) of a page in the middle of processing in an erasure block to be restored. This designates the header of the block at the time of the start of the restoration processing. As the processing is advanced, the value is sequentially incremented up to the tail of the block.

<Step ST112>

The page pointed to by the above garbage pointer is selected, and the data of the spare region thereof is read first. The "spare region" means a region for storing the management data generated in the storage device system separately from the storage of the user data. A spare region of about 72 bytes is previously provided in the flash memory with respect to the user data of for example 2 k Bytes. It is judged whether or not a selected page is valid or invalid based on the information described here.

<Step ST113>

It is judged whether a selected page is valid or invalid. When the result of judgment is that it is valid, the dummy update processing is executed. Namely, the entire selected page is read into the page buffer (ST114) first, the write destination on the flash memory is determined from the address search table 166 of FIG. 24, and the data is written into that (ST115). Namely, the data is copied and backed up to another block.

<Step ST116>

It is judged whether or not the garbage pointer indicates the tail page of the block. When the garbage pointer indicates the tail page of the block, the garbage pointer is cleared (ST117), and the target block is erased (ST118). If indicating the middle, the garbage pointer is incremented (ST119), and the routine returns to step ST111 where the processing of the next page is performed.

Note that it is also possible to omit the reading operation of step ST113 by reading all regions of the selected page at step ST112. Namely, all regions of the selected page are read into the page buffer first, then it is judged whether or not that page is valid from the data portion described in the spare region. When they are invalid, they are all discarded, and the routine shifts to step ST116. On the other hand, when they are valid, all data in the page has been already read into the page buffer, therefore the reading step is omitted, and the dummy updating processing is executed. In this case, it is necessary to read out larger data for the invalid pages, but multiple reading can be prevented for valid pages, and quick processing can be carried out.

The concrete technique for judging validity/invalidity of the page from the data of the spare region described in a page will be shown below.

First, as at step ST106 in FIG. 25, if a specific value is described as a flag in the spare region of the page which became invalid, this judgment can be immediately executed. However, where the write order of pages in the erasure block is restricted, there is no guarantee that the data can be further written once in the spare region of a page region in which the data has been already once written.

In this way, the judgment technique in the case where a partial change of a page region in which the data is once written is impossible will be explained according to the example of FIG. 24 explained before.

First, when writing the page data, the logical address corresponding to the spare region is written. In the case of FIG. 24, the physical address of PPA "0x060B0" was assigned with respect to the logical address of the LPA "0x05502" in an initial stage. Namely, in the page region on the flash memory corresponding to PPA "0x060B0", together with the user data, the logical address "0x05502" is described in the spare region thereof.

Here, when the data of LPA "0x05502" is updated by a command from the host controller, the data after updating is written into the page region corresponding to PPA "0x0AA02". At that time, the logical address "0x05502" is still described in the spare region thereof. On the other hand, the physical address field corresponding to LPA "0x05502" of the address conversion table 164 is updated to "0x0AA02".

Here, assumed that the restoration processing is applied to the block including the original data region PPA "0x060B0", and the garbage pointer turns to the page described next. At this time, the logical address "0x05502" is read from the spare region. When referring to the address conversion table 164 using that as the index, the corresponding physical address field has been updated to "0x0AA02", therefore does not coincide with the physical address "0x060B0" of the selected page. With this, it is judged that this page is invalid.

On the other hand, if the page is valid, the correspondence of the logical address and the physical address described in that spare region coincides with the correspondence of the address conversion table 164. At this time, the dummy update processing of step ST113 and following steps in FIG. 27 may be executed with the acquired logical addresses. In this case, by exactly the same routine for applying data updating to the logical addresses given from the host controller by the usual access, the valid data can be easily backed up.

Note that, here, the direct correspondence between the logical address and the physical address of each page was used for judgment, but a variety of formats are possible for the logical address. In general, this can be regarded as the handle value of the page data related to the address information input by the host controller.

Above, the explanation was given of the case where the restoration processing mechanism was provided inside an independent storage device. However, it is also possible to execute such management and restoration processing of the address conversion table by the control of the host controller side. An example of such a computer system is shown in FIG. 28.

Figure 28:
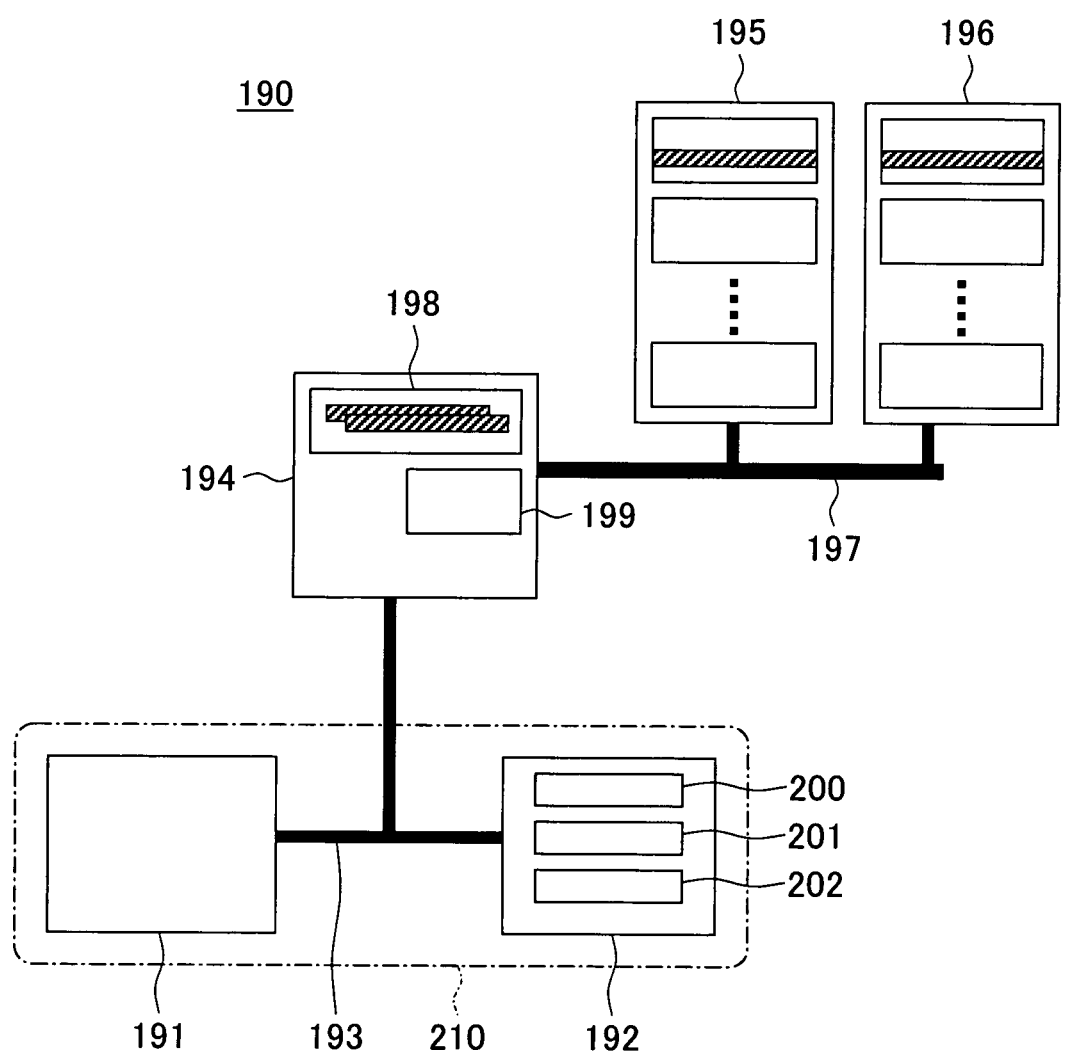
FIG. 28 is a diagram showing an example of the configuration of a computer system according to an eighth embodiment of the present invention.

FIG. 28 is a diagram showing an example of the configuration of the computer system according to an eighth embodiment.

A computer system 190 of FIG. 28 has a CPU 191 as the processing unit, a RAM 192 as the system memory, a system bus 193, a bridge circuit 194, NAND type flash memories 195 and 196, a data bus 197, a page buffer 198, and a control circuit 199 as principal components.

The CPU 191 is connected with the RAM 192 serving as the system memory via the system bus 193. Further, the bridge circuit 194 is connected to the system bus 193. Two chips of NAND type flash memories 195 and 196 each having 16-bit input/outputs are connected in parallel to the 32-bit data bus 197 linked with the bridge circuit 194. The two chips of the flash memories 195 and 196 are accessed simultaneously in parallel at the time of a read and write operation. The page buffer 198 for temporarily storing the accessed page regions and the control circuit 199 are built in the bridge circuit 194.

The bridge circuit 194 receives various types of commands from the CPU 191 and mediates the transfer of the data between the flash memories 195 and 196 and the CPU 191 or the system memory 192 by using the page buffer 198. Further, according to need, it applies error correction by ECC encoding to the transfer data. The commands received by the bridge circuit 194 include, for example, other than access to predetermined pages of the flash memories 195 and 196, erasing of predetermined blocks of the flash memories 195 and 196, copying of a predetermined page to a designated address of the predetermined page, and reset of the flash memories 195 and 196.

On the other hand, the system memory 192 is provided with a driver 200 for controlling the above flash memory system. This driver 200 receives the access request to the storage device from the operating system or application and converts the page address at the time of the access with reference to an address conversion table 201 constructed in the same memory. Further, at the time of data updating, it determines the write destination page address with reference to an address search table 202 and transmits the write command to the flash memories 195 and 196 to the bridge circuit 194 together with the updating data.

In such case, the host system 210 itself configured by the CPU 191 and the system memory 102 performs the role of the control circuit 152 in FIG. 23 for management of the address conversion table and restoration processing of the invalid page regions. Namely, the driver 200 uses tables the same as tables 164 and 165 shown in FIG. 24 for the address conversion table 201 and the address search table 202, receives the logical addresses from the operating system or application, generates the physical addresses (PPA), and transmits the commands to the bridge circuit 194 to thereby execute various types of accesses of the flash memories 195 and 196.

The present invention can also be applied to such a system in the same way. The host system 210 executes the following processing for each data region with respect to the flash memories 195 and 196 before erasing an erasure block. That is, first, it reads out at least a portion of the region, judges whether or not valid data is recorded in the data region from that value, and, when the result of judgment is that valid data is recorded, copies the data of the data region to another erasure block.

Namely, in the present case, it is possible to regard the host system 210 and flash memories etc. as configuring one storage system together.

As explained above, in the present storage device, in order to deal with the disadvantageous features of flash memories, attention is paid to the additional rewritting type storage system. In usual rewrites, backup of valid page regions and other redundant processing occurs along with each access of a user. This processing is unavoidable depending upon the state of the data region accessed. It is difficult to control the timing of occurrence timing independent from access.

On the other hand, in an additional rewritting type rewrite, the same overhead occurs at the time of the restoration of the invalidated data region, but the timing of occurrence can be freely determined in accordance with the convenience of the storage system or the host computer irrespective of the access situation of the user.

In usual applications, the data storage is not constantly being accessed. Rather, the period of no access is longer. Accordingly, by providing a function of extracting the period during which the flash memory is not directly accessed and executing the restoration processing by utilizing that period, the overhead along with the restoration processing can be made to seemingly disappear.

Summarizing the effects of the embodiments of the present invention, according to the embodiments of the present invention, high speed rewrites can be routinely realized in practical use while using a flash memory as a storage medium. Also the number of times of erasure can be decreased. By reducing rewrite fatigue, highly reliable rewrites are possible. Further, regions invalidated in the flash memory can be suitably restored while obtaining such an improvement in performance. Further, the storage region in a flash memory can be effectively used with low cost hardware while realizing high speed rewrites while using a flash memory as a storage medium.

It should be understood by those skilled in the art that various modifications, combinations, sub-combinations and alterations may occur depending on design acquirements and other factors insofar as they are within the scope of the appended claims or the equivalents thereof.

I claim:

1. A storage device comprising:
   a flash memory configured as a main storage including original data stored in an original region, and
   a control unit, the control unit configured to:
      divide restoration processing into an invalidation step, a rewriting step and an erasure step,
      rewrite at least a partial region of the original region in the flash memory by writing update data to an empty region and restoring an invalidated region of the original region,
      interrupt the restoration processing during the rewriting step when access occurs to data stored in the storage device from an external source while the restoration process is underway,
      store a state of progress in one of a memory and a register disposed in the storage device and to store a location of an erasure block to be restored as progress information, and
      set a flag indicating that the restoration processing was interrupted at a timing of a miss of a cache memory and perform processing to respond to the access, wherein
      when the processing to respond to the access is completed, the control unit is configured to execute the restoration processing from the location of the erasure block and to automatically restore the invalidated region of the original region as another empty region by erasing the original region at a time of standby of the storage device with no access from outside as the restoration processing.

2. The storage device as set forth in claim 1, wherein
   the flash memory has a plurality of erasure blocks as block erasure units, each erasure block including a plurality of page regions as write units independent from each other, and
   the control unit includes, as the restoration processing, backing up data of a valid page region remaining in an erasure block including an invalid page region to be restored to an erased empty region of another erasure block.

3. The storage device as set forth in claim 1, wherein, when interrupting the restoration processing, the control unit stores the progress information of the restoration processing in one of the register and the memory and, when the access ends, restarts the restoration processing with reference to the progress information.

4. The storage device as set forth in claim 3, wherein at least a portion of the progress information of the restoration processing is recorded in a nonvolatile RAM.

5. The storage device as set forth in claim 4, wherein the nonvolatile RAM is at least one of a ferro-electric memory (FeRAM), a ferro-magnetic memory (MRAM), an ovonic unified memory (OUM), and a magnetoresistance effect memory (RRAM).

6. The storage device as set forth in claim 3, wherein the storage device has a processing unit, the processing unit is configured to execute the restoration processing at the time of standby, and the processing unit interrupts the restoration processing and starts the access processing according to the access from the outside.

7. The storage device as set forth in claim 2, wherein the control unit is configured to divide the restoration processing of one or a plurality of invalid page regions existing in one erasure block into a plurality of steps and to execute a portion thereof at the time of standby of the storage device when there is no access from the outside.

8. The storage device according to claim 1, wherein said restoration processing is automatically executed with no awareness from a host computer.

9. The storage device according to claim 1, further comprising another flash memory and an internal data bus, the flash memory and the another flash memory are connected in parallel to the internal data bus.

10. A storage device comprising:
a flash memory configured as a main storage including original data stored in an original region, and
a control unit, the control unit configured to:
divide restoration processing into an invalidation step, a rewriting step and an erasure step,
rewrite at least a partial region of the original region in the flash memory by writing update data to an empty region and restoring an invalidated region of the original region,
interrupt the restoration processing during the rewriting step when access occurs to data stored in the storage device from an external source while the restoration process is underway,
store a state of progress in one of a memory and a register disposed in the storage device and to store a location of an erasure block to be restored as progress information, and
set a flag indicating that the restoration processing was interrupted at a timing of a miss of a cache memory and perform processing to respond to the access, wherein
when the processing to respond to the access is completed, the control unit is configured to execute the restoration processing from the location of the erasure block and to automatically restore the invalidated region of the original region as another empty region by erasing the original region at a time of standby of the storage device with no access from outside as the restoration processing.

11. The storage device as set forth in claim 10, wherein the flash memory has a plurality of erasure blocks as block erasure units, each erasure block including a plurality of page regions as write units independent from each other, and
the restoration processing includes backing up data of a valid page region remaining in an erasure block including an invalid page region to be restored to an erased empty region of another erasure block.

12. The storage device as set forth in claim 10, wherein the control unit stores the progress information of the restoration processing in one of the register and the memory when interrupting the restoration processing in response to a predetermined command from the outside and restarts the restoration processing with reference to the progress information when receiving an execution command of the restoration processing.

13. The storage device as set forth in claim 12, wherein at least a portion of the progress information of the restoration processing is recorded in a nonvolatile RAM.

14. The storage device as set forth in claim 13, wherein the nonvolatile RAM is at least one of a ferro-electric memory (FeRAM), a ferro-magnetic memory (MRAM), an ovonic unified memory (OUM), and a magnetoresistance effect memory (RRAM).

15. The storage device as set forth in claim 11, wherein the control unit divides the restoration processing of one or more invalid page regions existing in one erasure block into a plurality of steps and executes a portion thereof in response to a predetermined command from the outside.

16. The storage device according to claim 10, wherein said restoration processing is automatically executed with no awareness from a host computer.

17. The storage device according to claim 10, further comprising another flash memory and an internal data bus, the flash memory and the another flash memory are connected in parallel to the internal data bus.

18. A storage device comprising:
a flash memory configured as a main storage including original data stored in an original region,
a cache memory, and
a control unit, the control unit configured to:
divide restoration processing into an invalidation step, a rewriting step and an erasure step,
rewrite at least a partial region in the flash memory by writing update data to an empty region and restoring an invalidated region of the original region,
performs at least a portion of a processing for restoring the invalidated region from said empty region in parallel with a term where access from outside hits the cache memory and the cache is accessed during the restoration processing
interrupts the restoration processing during the rewriting step when access occurs to data stored in the storage device from an external source while the restoration processing is underway,
stores a state of progress in one of a memory and a register disposed in the storage device and stores a location of an erasure block to be restored as progress information, and
set a flag indicating that the restoration processing was interrupted at a timing of a miss of the cache memory and perform processing to respond to the access, wherein
when access from the outside misses the cache memory and the restoration processing is underway, the control unit interrupts the restoration processing and performs processing to respond to the access.

19. The storage device as set forth in claim 18, wherein
the flash memory has a plurality of erasure blocks as block erasure units, each erasure block including a plurality of page regions as write units independent from each other, and
the restoration processing includes backing up data of a valid page region remaining in an erasure block including an invalid page region to be restored to an erased empty region of another erasure block.

20. The storage device as set forth in claim 19, wherein the control unit stores the progress information of the restoration processing in one of the register and the memory when interrupting the restoration processing and restarts the restoration processing with reference to the progress information when the access ends.

21. The storage device as set forth in claim 19, wherein at least a portion of the progress information of the restoration processing is recorded in a nonvolatile RAM.

22. The storage device as set forth in claim 21, wherein the nonvolatile RAM is at least one of a ferro-electric memory (FeRAM), a ferro-magnetic memory (MRAM), an ovonic unified memory (OUM), and a magnetoresistance effect memory (RRAM).

23. The storage device as set forth in claim 22, wherein the control unit is configured to divide the restoration processing of one or more invalid page regions existing in one erasure block into a plurality of steps and to execute a portion thereof while access from the outside hits the cache memory and the cache is accessed.

24. The storage device according to claim 18, wherein said restoration processing is automatically executed with no awareness from a host computer.

25. The storage device according to claim 18, further comprising another flash memory and an internal data bus, the flash memory and the another flash memory are connected in parallel to the internal data bus.

26. A computer system comprising:
a host computer, and
a nonvolatile data storage including a flash memory configured as a main storage and storing various data handled in the host computer including original data stored in an original region,
wherein the host computer is configured to:
divide restoration processing into an invalidation step, a rewriting step and an erasure step,
rewrites at least a partial region of the original region in the flash memory by writing update data to an empty region and to restoring an invalidated region of the original region,
interrupt the restoration processing during the rewriting step when access occurs to data stored in the storage device from an external source while a restoration processing is underway,
store a state of progress in one of a memory and a register disposed in the storage device and store a location of an erasure block to be restored as progress information, and
set a flag indicating that the restoration processing was interrupted at a timing of a miss of a cache memory and perform processing to respond to the access, wherein
when processing to respond to the access is completed, the restoration processing is executed from said location of said erasure block; and to automatically restore the invalidated region of the original region as another empty region by erasing the original region at a time of standby when there is no data processing request for the data storage other than that for the restoration processing.

27. The computer system as set forth in claim 26, wherein the flash memory has a plurality of erasure blocks as block erasure units, each erasure block including a plurality of page regions as write units independent from each other, and
the restoration processing includes backing up data of a valid page region remaining in an erasure block including an invalid page region to be restored to an erased empty region of another erasure block.

28. The computer system as set forth in claim 26, wherein the host computer temporarily interrupts the restoration processing when a request for data access to the data storage occurs and the restoration processing is underway and, when temporarily interrupting the restoration processing, stores the progress information of the restoration processing in when one of the register and the memory inside the computer system and restarts and continues the restoration processing with reference to the progress information when executing the restoration processing again.

29. The computer system as set forth in claim 28, wherein at least a portion of the progress information of the restoration processing is recorded in a nonvolatile RAM.

30. The computer system as set forth in claim 29, wherein the nonvolatile RAM is at least one of a ferro-electric memory (FeRAM), a ferro-magnetic memory (MRAM), an ovonic unified memory (OUM), and a magnetoresistance effect memory (RRAM).

31. The computer system as set forth in claim 27, wherein the host computer is configured to divide the restoration processing of one or more invalid page regions existing in one erasure block into a plurality of steps and to execute a portion thereof at the time of standby where there is no access to the data storage from the outside.

32. The computer system according to claim 26, wherein said restoration processing is automatically executed with no awareness from the host computer.

33. The computer system according to claim 26, further comprising another flash memory and an internal data bus, the flash memory and the another flash memory are connected in parallel to the internal data bus.

* * * * *